(12) United States Patent
Matsumoto

(10) Patent No.: US 11,705,739 B2
(45) Date of Patent: Jul. 18, 2023

(54) COMMUNICATION SYSTEM

(71) Applicant: DENSO CORPORATION, Kariya (JP)

(72) Inventor: Sho Matsumoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 351 days.

(21) Appl. No.: 17/066,696

(22) Filed: Oct. 9, 2020

(65) Prior Publication Data

US 2021/0119456 A1 Apr. 22, 2021

(30) Foreign Application Priority Data

Oct. 17, 2019 (JP) .................................. 2019-190338

(51) Int. Cl.
| | | |
|---|---|---|
| *H02J 7/00* | (2006.01) | |
| *H01Q 1/32* | (2006.01) | |
| *G08C 17/02* | (2006.01) | |
| *H04W 72/0453* | (2023.01) | |
| *H01M 10/48* | (2006.01) | |

(52) U.S. Cl.
CPC .......... *H02J 7/00034* (2020.01); *G08C 17/02* (2013.01); *H01M 10/482* (2013.01); *H01Q 1/3233* (2013.01); *H04W 72/0453* (2013.01)

(58) Field of Classification Search
None
See application file for complete search history.

(56) References Cited

U.S. PATENT DOCUMENTS

| | | |
|---|---|---|
| 2004/0185861 A1 | 9/2004 | Domon et al. |
| 2006/0284593 A1* | 12/2006 | Nagy .................. H02J 7/00 320/109 |
| 2011/0106336 A1* | 5/2011 | Eikeland ............... G08G 1/20 348/148 |
| 2012/0147777 A1 | 6/2012 | Arashin et al. |
| 2012/0163324 A1 | 6/2012 | Arashin et al. |
| 2016/0294019 A1 | 10/2016 | Yamauchi et al. |

FOREIGN PATENT DOCUMENTS

| | | |
|---|---|---|
| JP | 2014-068134 A | 4/2014 |
| JP | 2014-107762 A | 6/2014 |
| JP | 2016-012954 A | 1/2016 |
| JP | 2018-174497 A | 11/2018 |

* cited by examiner

*Primary Examiner* — Arun C Williams
(74) *Attorney, Agent, or Firm* — Posz Law Group, PLC

(57) ABSTRACT

A communication system includes at least one terminal device for acquiring at least information about a battery; and at least one management device. The management device communicates with the terminal device. One of the management device and the terminal device includes a multi-band communication device configured to perform communication using plural, different frequency bands. The other of the management device and the terminal device includes a specific communication device configured to perform communication using at least one frequency band among the plural, different frequency bands.

20 Claims, 13 Drawing Sheets

COMMUNICATION SYSTEM

CROSS REFERENCE TO RELATED APPLICATION

The present application is based on and claims the benefit of priority of Japanese Patent Application No. 2019-190338, filed on Oct. 17, 2019, the disclosure of which is incorporated herein by reference.

TECHNICAL FIELD

The present disclosure relates to a communication system including at least one terminal device that acquires information about a battery and at least one management device that communicates with the terminal device.

BACKGROUND INFORMATION

A battery system may include an intermediate management device and a terminal management device provided in each battery. The terminal management device acquires information about the battery.

In one conventional technique, the intermediate management device and the terminal management device perform wireless communication using one specific frequency band. However, as a result of a detailed study by the applicant, the applicant of the present application has found that it is difficult to recover a good communication state between the intermediate management device and the terminal management device when the communication condition using a certain frequency band is deteriorated.

SUMMARY

It is an object of the present disclosure to provide a communication system, when a communication state using a certain frequency band is deteriorated, capable of recovering a good communication state of such frequency band.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
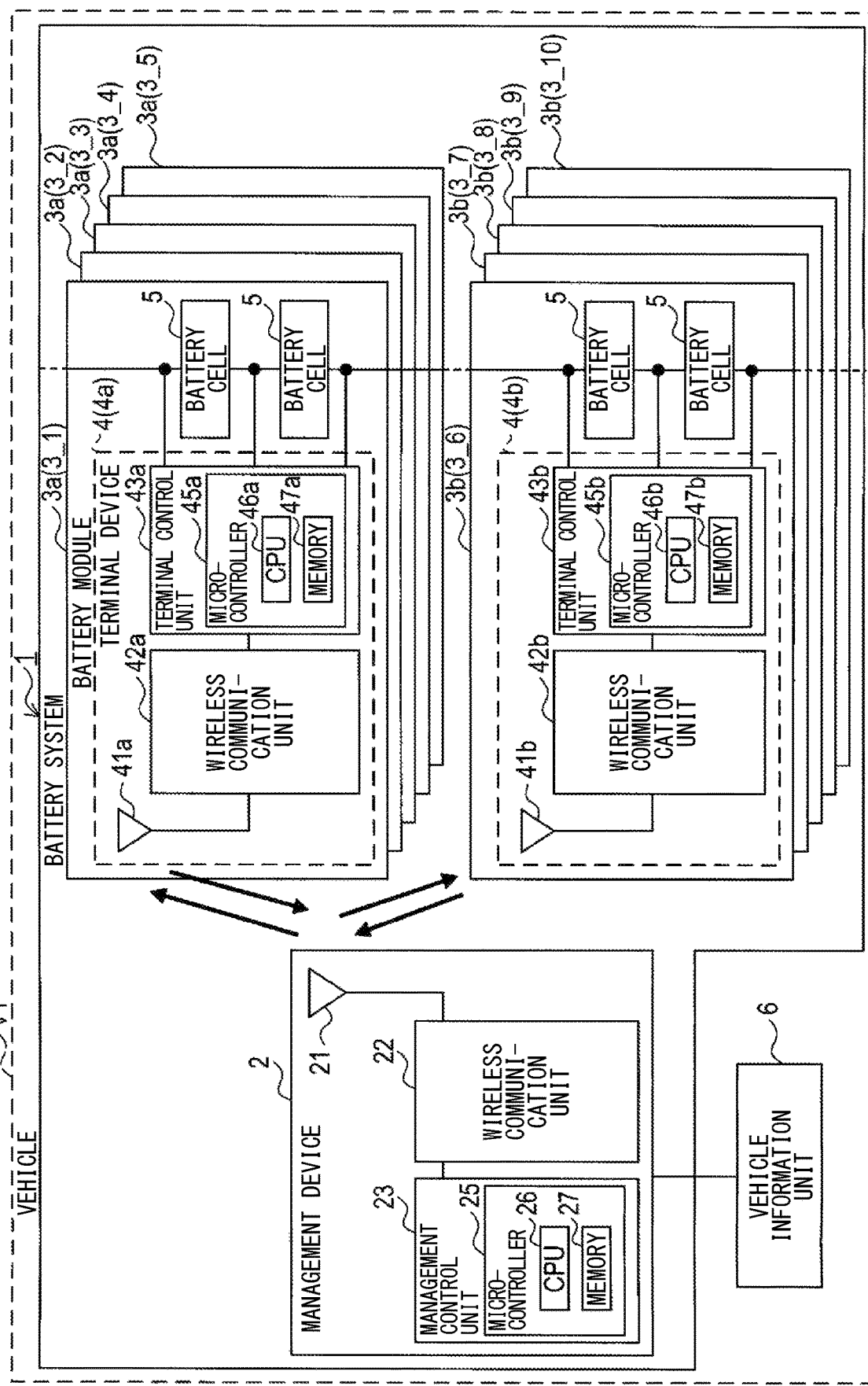
FIG. 1 is a block diagram of a configuration of a communication system.

Hereinafter, exemplary embodiments of the present disclosure are described with reference to the drawings.

1. First Embodiment

[1. Configuration]

The configuration of a communication system 1 according to the present embodiment is described with reference to FIGS. 1 and 2.

The communication system 1 is mounted on a vehicle V1. The communication system 1 includes one management device 2 and a battery module cluster 3. The communication system 1 may include a vehicle information unit 6. The vehicle information unit 6 includes plural in-vehicle sensors and devices that detect a state of the vehicle V1. More specifically, a wheel speed sensor, an acceleration sensor, a yaw rate sensor, and the like may be included.

Each of the individual battery modules (3-1 to 3-10) is similarly configured. One battery module 3-1 includes one terminal device 4 and at least one battery cell 5. That is, the communication system 1 includes plural terminal devices 4. The management device 2 performs wireless communication with each terminal device 4. Each terminal device 4 acquires battery information and performs wireless communication with the management device 2. The battery information means information about the state of the associated battery cell 5. In the present embodiment, for example, a voltage of the battery cell 5 corresponds to the battery information.

Figure 2:
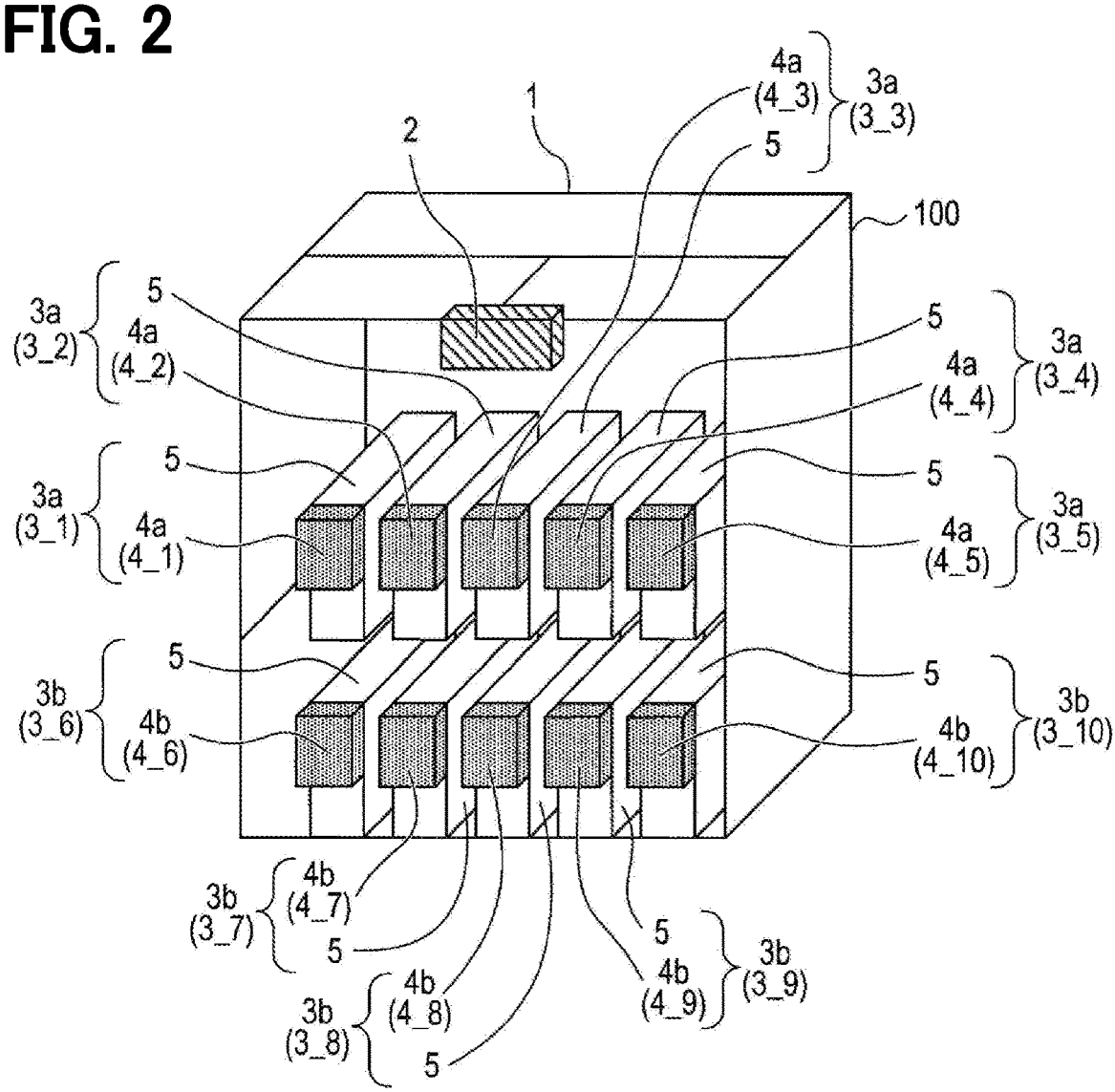
FIG. 2 is a schematic diagram of a configuration of a communication system.

As shown in FIG. 2, the management device 2 and the battery module cluster 3 is arranged in a housing 100 installed in the vehicle V1. In the present embodiment, the housing 100 is made of metal. Here, any battery modules arranged at a position relatively close to the management device 2 are classified as a close battery module group 3a (including battery module 3-1 to 3-5). On the other hand, among the battery module cluster 3, all individual battery modules arranged at a relatively far position from the management device 2 are referred to as a far battery module group 3b (including battery modules 3-6 to 3-10). These groups are also known as the first battery module group 3a and the second battery module group 3b.

That is, a distance between the management device 2 and the far battery module group 3b is, on average, greater than a distance between the management device 2 and the near battery module group 3a. In the present embodiment, the near battery module group 3a includes the near battery modules 3-1 to 3-5, and the far battery module group 3b includes the far battery modules 3-6 to 3-10.

In the following, when describing the individual battery modules, the reference numerals are attached like the battery module 3-1. Further, when a description common to the battery modules groups is provided, it is described as follows. Further, near battery module components are provided with a suffix (a). For example, each terminal device 4 in a near battery module 3-1 to 3-5 is more specifically identified as terminal device 4a (or as near terminal 4a). Similarly, each terminal module 4 in a far battery module 3-6 to 3-10 is specifically identified as terminal 4b (or as far terminal 4b).

Regarding the distance between the management device 2 and the battery modules 3 described above, the distance between the management device 2 and any far terminal device 4b is greater than the distance between the management device 2 and any near terminal device 4a, for example.

Note that, in FIGS. 1 and 2, an example in which the battery module 3 includes the plural battery cells 5 is illustrated, but the battery module 3 may include only one battery cell 5. The number of battery cells 5 included in each individual battery module may vary. When the battery module 3-1 includes plural battery cells 5, the plural battery cells 5 may be connected in series with each other as shown in FIG. 1, or may be connected in parallel (not shown in the drawing), or it may be a mix of in-series and parallel connections.

Moreover, the housing 100 is not limited to a metal housing. For example, the housing 100 may be made of resin, may be made of both metal and resin, or may be made of material other than metal and resin. Further, although the housing 100 is formed in a box shape in FIG. 2, the shape of the housing 100 is not limited to such shape. For example, the housing 100 may have any shape other than the box shape, in which the communication system 1 can be arranged. Further, for example, the housing 100 may or may not have a radio wave shielding effect. For example, the housing 100 may be an outer shell of the vehicle V1 itself. The housing 100 does not have to be hermetically sealed.

<Management Device 2>

With reference to FIG. 1, the explanation is continued. The management device 2 includes an antenna 21, a wireless communication unit 22 as a multi-band communication device described later, and a management control unit 23. The wireless communication unit 22 may also be a specific communication device described later.

<Wireless Communication Unit 22>

The wireless communication unit 22 uses plural predetermined frequency bands for use in the communication system 1 to send and receive wireless communication signals via the antenna 21 to/from the terminal devices 4 included in each of the battery modules. The plural frequency bands used in the communication system 1 may be, for example, a high UHF band (that is, Ultra High Frequency of several GHz).

Figure 3:
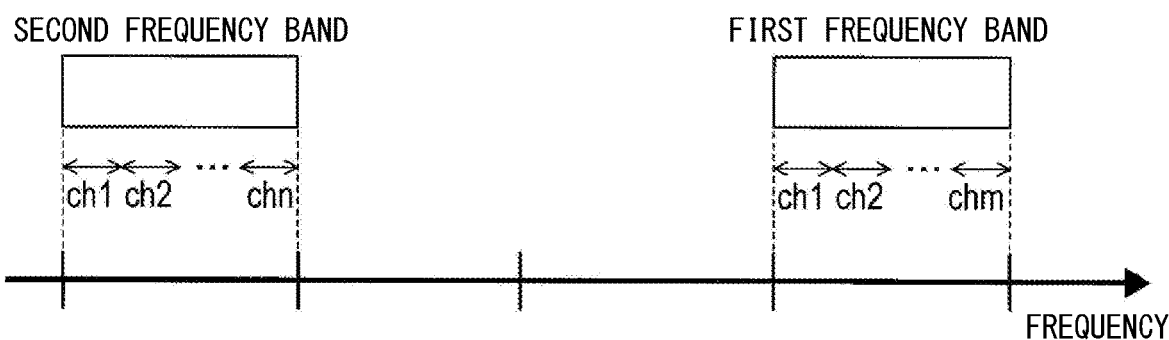
FIG. 3 is an explanatory diagram of an example of plural frequency bands used in the communication system.

In FIG. 3, the plural frequency bands used in the communication system 1 are two frequency bands. One of the two frequency bands is called as a first frequency band, and the other is called as a second frequency band. For example, the first frequency band is the 5 GHz band (and may be called the higher frequency band in this example). The second frequency band is the 2.4 GHz band (and may be called the lower frequency band in this case). In each frequency band, a frequency channel can be provided by a number acquired by dividing the frequency band by a specific bandwidth. For example, in the second frequency band, the number of frequency channels is 40, which is derivable by dividing, for example, 2.4 GHz to 2.48 GHz by a specific bandwidth of 2 MHz.

The wireless communication unit 22 transmits and receives wireless communication signals according to a predetermined communication standard for each of the first frequency band and the second frequency band. Examples of the predetermined communication standard include WiFi (registered trademark), Bluetooth (registered trademark), and Bluetooth Low Energy and the like. Moreover, the wireless communication unit 22 may be a device to which a standard using UWB is applied. UWB is an abbreviation for Ultra Wide Band. Moreover, the wireless communication unit 22 may be a device to which a standard of another frequency band is applied.

Figure 4:
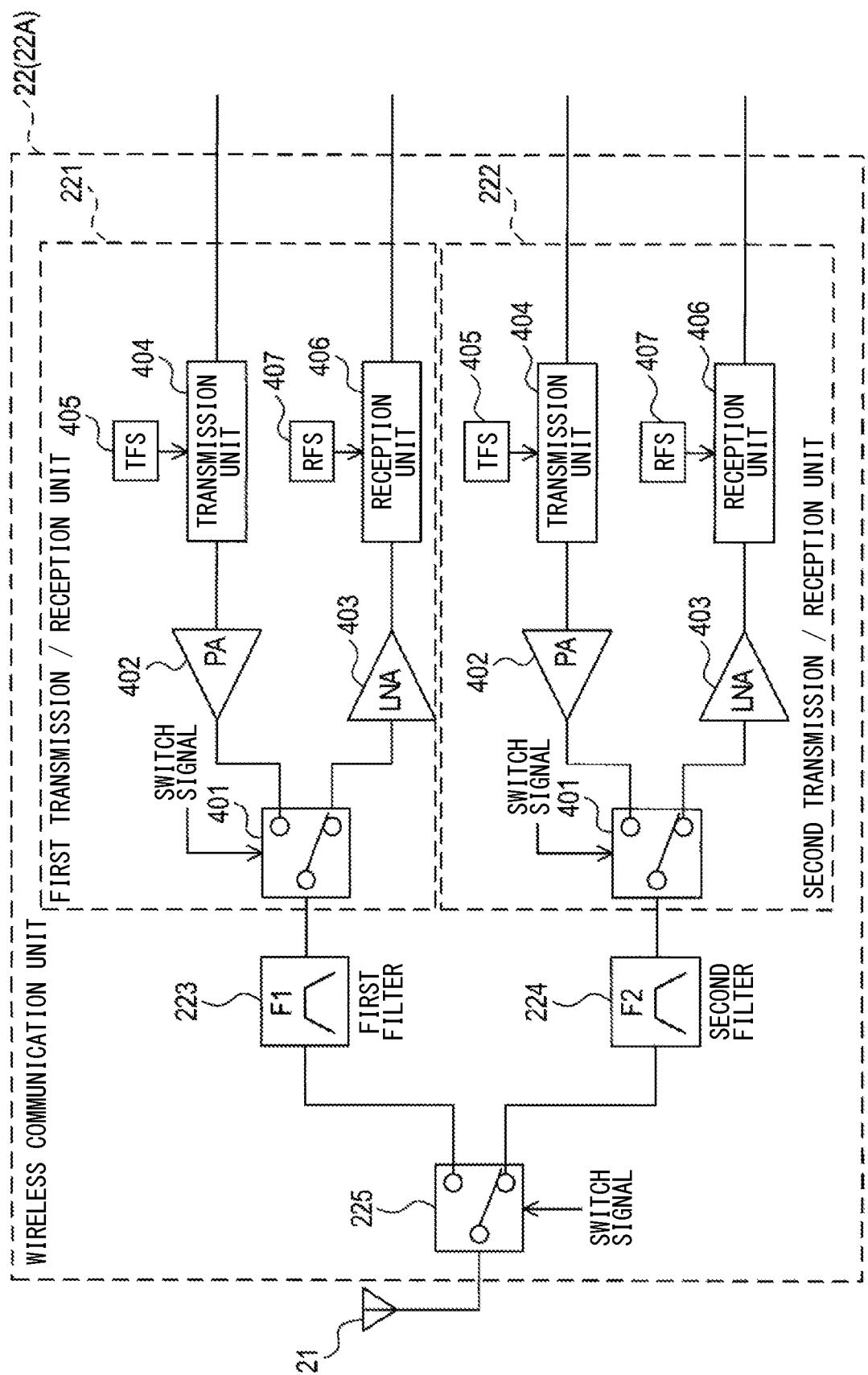
FIG. 4 is a block diagram of a configuration of a wireless communication unit included in a management device.

In FIG. 4, the wireless communication unit 22 of the present embodiment includes a first transmission/reception unit 221 (also known as a first transceiver), a second transmission/reception unit 222 (also known as a second transceiver), a first filter 223, a second filter 224, and a main switch 225. In the drawings mentioned below, "F1" represents the first frequency band and "F2" represents the second frequency band.

The main switch 225 (also known as a wireless communicator switch or an antenna switch) has three terminals. One of the three terminals is connected to the antenna 21, one terminal is connected to the first filter 223, and one terminal is connected to the second filter 224. The main switch 225 selects one of three states such as a state in which the first filter 223 is selected, a state in which the second filter 224 is selected, and a stop state according to a switch signal from the management control unit 23. The stop state here means a state in which both the first filter 223 and the second filter 224 are not selected, or a terminated state. The main switch 225 may be described as a three-state switch, and may be represented by an icon including an additional terminal/circle (not shown) that is not connected to other component (a "stop" or "dummy" terminal). Note, icons for these switches (main switch 225, first switch 401, and second switch 401) illustrate mechanical switches, but may be solid state switches (transistors).

The first filter 223 is a BPF (that is, a band-pass filter) that passes the first frequency band. The first filter 223 includes two terminals, one terminal of the two terminals is connected to the main switch 225, and the other terminal is connected to the first transceiver 221.

The second filter 224 is a BPF (that is, a band-pass filter) that passes the second frequency band. The second filter 224 has two terminals, one terminal of the two terminals is connected to the main switch 225, and the other terminal is connected to the second transceiver 222.

The first transceiver 221 uses the first frequency band to transmit/receive (transmit or receive) a wireless communication signal. The second transceiver 222 uses the second frequency band to transmit/receive a wireless communication signal. The first transceiver 221 and the second transceiver 222 have the same configuration except that the frequency bands used are different. Therefore, only the first transceiver 221 is described below.

The first transceiver 221 includes a transceiver switch 401, a power amplifier (hereinafter, PA) 402, a low noise amplifier (hereinafter, LNA) 403, a transmission unit 404, a transmission frequency switch (TFS) 405, a reception unit 406, and a reception frequency switch (RFS) 407.

The transceiver switch 401 has three terminals. One of the three terminals is connected to the first filter 223, one terminal is connected to the PA 402, and one terminal is connected to the LNA 403. The transceiver switch 401 selects one of three states such as a state in which the PA 402 is selected, a state in which the LNA 403 is selected, and a stop state according to a switch signal from the management control unit 23. The stop state here means a state where neither the PA 402 nor the LNA 403 is selected, or a terminated state.

The PA 402 has two terminals, one of the two terminals is connected to the transceiver switch 401, and the other terminal is connected to the transmission unit 404. The LNA 403 has two terminals, one of the two terminals is connected to the transceiver switch 401, and the other terminal is connected to the reception unit 406.

The transmission unit 404 uses the first frequency band and transmits a wireless communication signal according to the above-described predetermined communication standard. The transmission frequency switch 405 sequentially switches the frequency used by the transmission unit 404 for transmission in the first frequency band according to a predetermined rule (that is, schedule). Hereinafter, the frequency of the wireless communication signal transmitted by the transmission unit 404 is referred to as a designated frequency. Although not described here, such frequency switching may be performed by a known technique using frequency hopping, for example.

The reception unit 406 uses the first frequency band and receives a wireless communication signal according to the above-described predetermined communication standard. The reception frequency switch 407 sequentially switches the frequencies received by the reception unit 406 in the first frequency band according to the above-described predetermined rule. The switching may be performed, for example, in synchronization with the transmission frequency switch 405 provided in a transmission source (i.e., an origin of transmission) of the communication signal (for example, the terminal device 4) so that the same frequency becomes the designated frequency at the same timing.

Although not shown, the wireless communication unit 22 includes a detection device that detects a reception intensity of the reception signal and outputs the detection result. As described above, the second transceiver 222 is configured similarly to the first transceiver 221, and a major difference among the two units 221 and 222 is that the second frequency band is used in the second transceiver 222. Therefore, in the second transceiver 222, one of the terminals included in the transceiver switch 401 is connected to the second filter 224 instead of the first filter 223, which is different from the unit 221.

<Management Control Unit 23>

Figure 5:
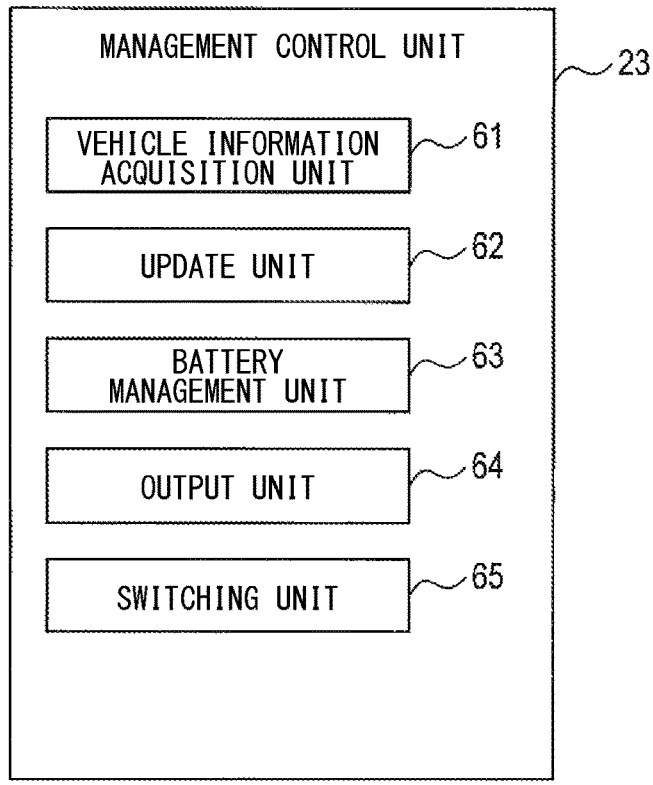
FIG. 5 is a block diagram of functions of the management device.

In FIG. 5, the management control unit 23 includes a microcomputer or microcontroller 25 including a CPU 26, a ROM, a RAM, and a semiconductor memory (hereinafter, memory) 27 such as a flash memory. The management control unit 23 realizes each of the function such as the ones shown in FIG. 5 by the CPU 26 executing a program stored in a non-transitory, tangible storage medium. The memory 27 corresponds to a non-transitory, tangible storage medium that stores a computer program. Further, by executing such a computer program, a method corresponding to the computer program is performed.

As shown in FIG. 5, the management control unit 23 has the functions of a vehicle information acquisition unit 61, an update unit 62, a battery management unit 63, an output unit 64, and a switching unit 65. The vehicle information acquisition unit 61 acquires the detection result from the vehicle information unit 6. For example, the vehicle information acquisition unit 61 may acquire the output of the wheel speed sensor included in the vehicle information unit 6, detect the vehicle speed, and store the vehicle speed in the memory 27. These functions may be instructions stored in the memory 27, or may be hardware circuits, or may be a combination of instructions and hardware.

The update unit 62 determines a used frequency band to be used for each of the terminal devices 4 at a predetermined cycle. The used frequency band is at least one frequency band of plural frequency bands used in the communication system 1, and refers to a frequency band used for communication between the management device 2 and the terminal device 4. In the present embodiment, the management device 2 and the terminal device 4 communicate with each other using one frequency band as a used frequency band. The used frequency band is determined for each terminal device 4. The determined used frequency band is stored in the memory 27 for each terminal device 4. One frequency band of the plural frequency bands used in the communication system 1 can be commonly shared as the used frequency band among the terminal devices 4.

In the present embodiment, for example, in an initial state such as at the time of shipment from the factory, for the first terminal device 4a, the first frequency band may be stored in the memory 27 as the used frequency band, and for the second terminal device 4b, the second frequency band may be stored in the memory 27 as a used frequency band. That is, in other words, in the second terminal device 4b, the wireless communication unit 42 included therein, in the second terminal device 4b, may use a lower used frequency band than a used frequency band used by the first terminal device 4a, among the plural frequency bands used in the communication system 1. As described above, the second terminal device 4b is arranged at a position farther from the management device 2 than the first terminal device 4a.

The battery management unit 63 manages the state of the battery cells 5 included in each of the plural battery modules 3 at a predetermined cycle (hereinafter, battery management cycle). The management here means that, for example, the voltage and temperature of the battery cell 5 are transmitted from the terminal device 4 and is acquired and stored in the memory 27 as the battery information. In the present embodiment, as described above, the voltage of the battery cell 5 is acquired as the battery information.

Among the processes executed by the management control unit 23 described later, S105 corresponds to a process as the vehicle information acquisition unit 61, S170 to S185 correspond to a process as the battery management unit 63, and S115 to S165 correspond to a process as the update unit 62.

The output unit 64 outputs the battery information stored in the memory 27 to an external device of the communication system 1. The external device may be, for example, an electronic control device included in the vehicle V1. The switching unit 65 outputs a switch signal to the wireless communication unit 22 in accordance with an execution instruction from the update unit 62 and from the battery management unit 63. The switch signal is a signal for switching the communication state of the wireless communication unit 22. The execution instruction is a signal for causing the switching unit 65 to switch the communication state of the wireless communication unit 22. In the present embodiment, the switching unit 65 switches the communication state of the wireless communication unit 22 to any one of the four communication states.

The four communication states include a first transmission state, a first reception state, a second transmission state, and a second reception state. The first transmission state is a state in which communication signals in the first frequency band are transmitted, and the first reception state is a state in which communication signals in the first frequency band are received. The second transmission state is a state in which communication signals in the second frequency band are transmitted, and the second reception state is a state in which communication signals in the second frequency band are received.

For example, the switching unit 65 outputs a switch signal to the wireless communication unit 22 in the following manner when an execution instruction to set the wireless communication unit 22 to the first transmission state is input thereto. That is, the switching unit 65 outputs, to the main switch 225, a switch signal that connects the antenna 21 and the first filter 223 (See FIG. 4). Further, a switch signal for connecting the first filter 223 and the PA 402 is output to the transceiver switch 401 included in the first transceiver 221. Note that a switch signal output to the transceiver switch 401 in the second transceiver 222 is a switch signal for setting the stop state. As a result, the wireless communication unit 22 enters into a state in which the communication signal in the first frequency band is transmitted.

The switching unit 65 outputs a switch signal to the wireless communication unit 22 in the following manner when an execution instruction for setting the wireless communication unit 22 to the first reception state is input thereto. That is, the switching unit 65 outputs, to the main switch 225, a switch signal that connects the antenna 21 and the first filter 223 (See FIG. 4). Further, a switch signal for connecting the first filter 223 and the LNA 403 is output to the transceiver switch 401 included in the first transceiver 221. Note that a switch signal output to the transceiver switch 401 in the second transceiver 222 is a switch signal for setting the stop state. As a result, the wireless communication unit 22 enters into a state of receiving the communication signal in the first frequency band.

The switching unit 65 outputs a switch signal to the wireless communication unit 22 in the following manner when an execution instruction for setting the wireless communication unit 22 in the second transmission state is input. That is, the switching unit 65 outputs, to the main switch 225, a switch signal that connects the antenna 21 and the second filter 224. Further, a switch signal that connects the first filter 223 and the PA 402 is output to the transceiver switch 401 in the second transceiver 222. Note that a switch signal output to the transceiver switch 401 in the first transceiver 221 is a switch signal for setting the stop state. As a result, the wireless communication unit 22 enters into a state in which the communication signal in the second frequency band is transmitted.

When an execution instruction to put the wireless communication unit 22 into the second reception state is input, the switching unit 65 outputs a switch signal to the wireless communication unit 22 in the following manner. That is, the switching unit 65 outputs, to the main switch 225, a switch signal that connects the antenna 21 and the second filter 224. Further, a switch signal for connecting the first filter 223 and the LNA 403 is output to the transceiver switch 401 in the second transceiver 222. Note that a switch signal output to the transceiver switch 401 in the first transceiver 221 is a switch signal for setting the stop state. As a result, the wireless communication unit 22 enters into a state of receiving the communication signal in the second frequency band.

Correspondence information is stored in the memory 27. The correspondence information is information of correspondence (i.e., establishing association) between (i) identification information for identifying each of the plural terminal devices 4 and (ii) the used frequency band of each of the plural terminal devices 4.

<Terminal Device 4>

In FIG. 1, the communication system 1 includes the battery modules 3-1 to 3-10 (together called battery module cluster 3), and one battery module 3-1 includes the (i.e., one) terminal device 4 and the plural battery cells 5. In other words, the communication system 1 comprises the plural terminal devices 4. The terminal devices 4 are similarly configured to each other. One terminal device 4 includes an antenna 41, a wireless communication unit 42 as a multi-band communication device described later, and a terminal control unit 43. The wireless communication unit 42 may also be a specific communication device described later. Small letters (41a, 42a, 43a) designate that these components are located in the close battery module group 3a, which includes battery modules 3-1 to 3-5.

<Wireless Communication Unit 42>

In FIG. 1, the wireless communication unit 42 transmits/receives a wireless communication signal to/from the management device 2 included in the communication system 1 via the antenna 41, for example, using the high UHF band. The wireless communication unit 42 is configured to wirelessly communicate using plural, different frequency bands. The plural frequency bands are the above-mentioned first frequency band and second frequency band. Since the wireless communication unit 42 has the same configuration as the wireless communication unit 22 shown in FIG. 4, only the differences are described here and detailed description thereof is omitted. The terminal of the main switch 225 in the wireless communication unit 42 is connected to the antenna 41 instead of the antenna 21. In the wireless communication unit 42, the main switch 225, the transceiver switch 401 included in the first transceiver 221 and the transmission/reception switch 401 included in the second transceiver 222 select terminals to be connected according to a switch signal from the terminal control unit 43.

<Terminal Control Unit 43>

In FIG. 1, the terminal control unit 43 includes a microcontroller 45 including a CPU 46 and a memory 47, similar to the wireless communication unit 22 of the management device 2. The terminal control unit 43 realizes the function shown in FIG. 5 by the CPU 46 executing a program stored in a non-transitory, tangible storage medium. The memory 47 corresponds to a non-transitory, tangible storage medium that stores a computer program. Further, by executing such a computer program, a method corresponding to the computer program is performed. These functions may alternatively be performed by hardware, or by a combination of hardware and stored instructions.

Figure 6:
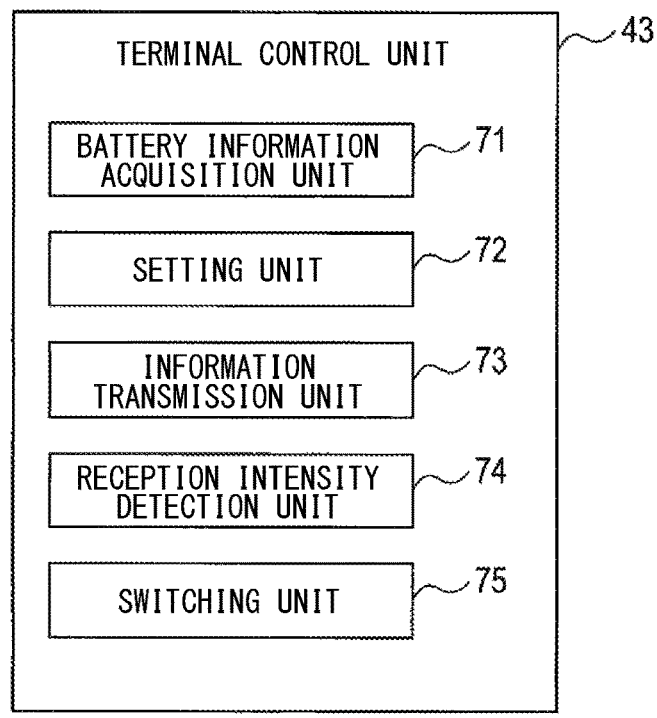
FIG. 6 is a block diagram of functions of a terminal device.

In FIG. 6, the terminal control unit 43 has the functions of a battery information acquisition unit 71, a setting unit 72, an information transmission unit 73, a reception intensity detection unit 74, and a switching unit 75. The battery information acquisition unit 71 acquires the battery information from the battery cells 5 and stores it in the memory 47 at a predetermined cycle (hereinafter, an information acquisition cycle). Here, the voltage values are acquired at both ends of the battery cell 5 as described above. The information acquisition cycle may be a cycle shorter than a terminal management cycle described later.

The setting unit 72 performs a process for updating the used frequency band by the terminal device 4 according to start information received from the management device 2. In the present embodiment, for example, in an initial state such as when shipped from a factory, the first frequency band is stored in the memory 47 as the used frequency band of the first terminal device 4a, and, regarding the second terminal device 4b, the second frequency band is stored in the memory 47 as the used frequency band of the second terminal device 4b.

The information transmission unit 73 uses the wireless communication unit 42 in accordance with a transmission instruction signal received from the management device 2 at a predetermined cycle (i.e., the terminal management cycle), to send the battery information to the management device 2 by the communication signal in the used frequency band.

The reception intensity detection unit 74 detects a reception intensity of the wireless communication signal by the above-described detection device (not shown) each time the wireless communication unit 42 receives the wireless communication signal, and stores the information indicating the detected reception intensity in the memory 47.

The switching unit 75 is configured similarly to the switching unit 65 included in the management control unit 23. However, the switching unit 75 outputs a switch signal to the wireless communication unit 42 in accordance with the execution instructions from the setting unit 72 and the information transmission unit 73. The switching unit 75 switches the communication state of the wireless communication unit 42 to any one of the four communication states described above.

Figure 8:
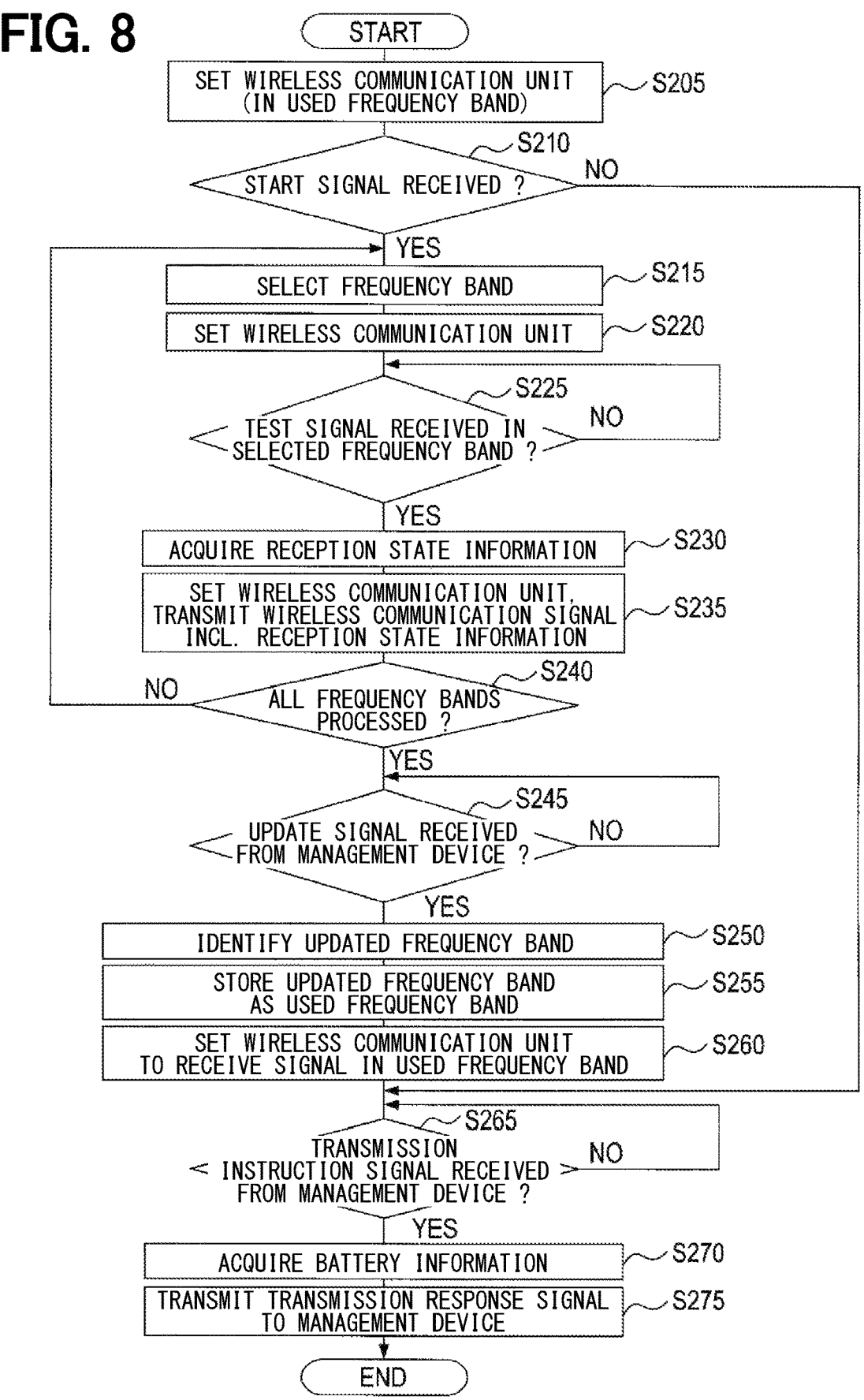
FIG. 8 is a flowchart of a process executed by a terminal control unit.

In FIG. 8, note that S210 to S260 in a process executed by the terminal control unit 43 described later correspond to the process as the setting unit 72, and S265 to S275 correspond to the process as the information transmission unit 73. As described above, the memory 47 stores the used frequency band and the reception intensity of the terminal device 4, and the like.

[2. Process]
<2. 1 Process Executed by the Management Control Unit 23>

Figure 7:
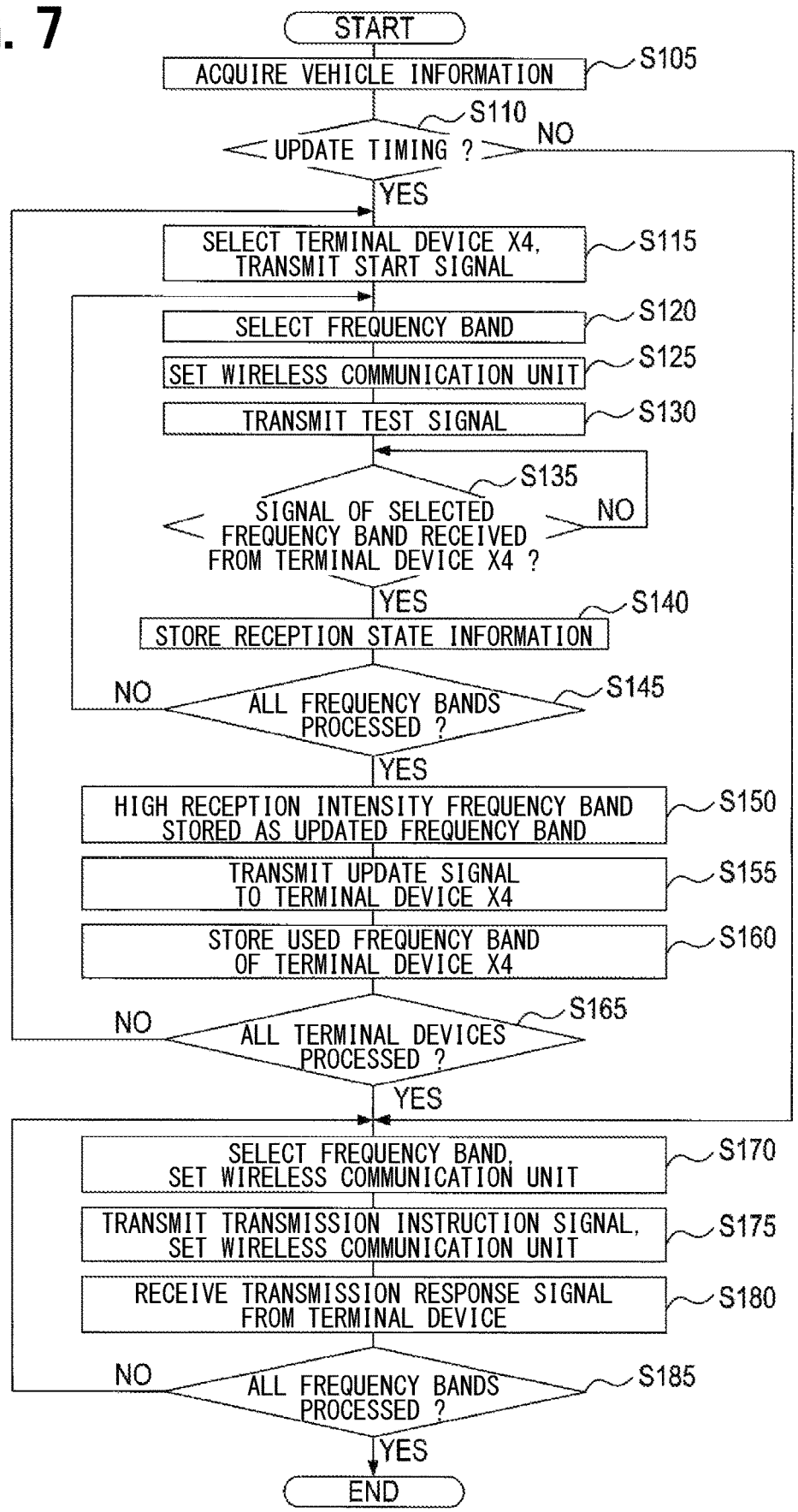
FIG. 7 is a flowchart of a process executed by a management control unit.

FIG. 7 is a flowchart describing a process executed by the management control unit 23. The management control unit 23 repeatedly executes the process of FIG. 7 at a predetermined cycle (that is, the battery management cycle described above), and acquires the battery information from the terminal device 4. However, the management control unit 23 also updates the used frequency band of the terminal device 4 at (i.e., whenever it is) an update timing described later.

The management control unit 23 acquires the vehicle information in S105. In the present embodiment, the vehicle speed based on the wheel speed sensor is acquired. The vehicle information is not limited to such information, however. Also, the management control unit 23 may acquire various information such as time information detected by a timer included in the microcomputer 25 as the vehicle information.

In S110, the management control unit 23 determines whether it is the update timing. The update timing is a timing of updating the used frequency band for each terminal device 4. The management control unit 23 determines that it is the update timing when a predetermined update condition is satisfied. The update condition is a condition for determining the update timing.

In the present embodiment, the management control unit 23 determines that the update timing is reached when the vehicle V1 stops, i.e., by considering a stop of the vehicle V1 as a satisfaction of the update condition. Here, "stop" is not limited to a stop in the strict sense, i.e., "stop" may be not strictly limited to stop (i.e., a speed of vehicle being zero or the like) as long as the same effect as the above can be acquired. More specifically, the management control unit 23 determines that the vehicle V1 has stopped when the vehicle speed acquired in S105 is less than a stopped vehicle speed.

The stopped vehicle speed is a speed of predetermined value close to 0 (for example, about a vehicle speed of several kilometers per hour to several tens of kilometers per hour), and is stored in the memory 27. The management control unit 23 shifts the process to S115 when it is determined that it is the update timing, and shifts the process to S170 when it is determined that the update timing is not reached.

The determination of whether it is an update timing is not limited to a timing when the vehicle V1 stops. For example, the management control unit 23 may determine that it is the update timing every time a predetermined time has elapsed, based on the time information.

In S115 to S165, the management control unit 23 updates the used frequency band for each of the plural terminal devices 4. In S115, the management control unit 23 selects one terminal device 4 for updating the used frequency band from among the plural terminal devices 4 in the communication system 1. In the following description, the selected terminal device 4 is described as a terminal device X4. The management control unit 23 selects, from among the plural terminal devices 4, a terminal device 4 whose used frequency band has not yet been updated as the terminal device X4 (also knowns as a selected terminal, or a target terminal).

Then, the management control unit 23 transmits a start signal to the selected terminal device X4 by using the used frequency band of the selected terminal device X4 stored in the memory 27. The start signal is a signal indicating that the update of the used frequency band for the selected terminal device X4 is started.

The start signal may be a signal including start information represented by a predetermined identification pattern using a binary value such as "0" and "1." Further, the start signal may be a signal including the identification information of the terminal device X4.

In S120, the management control unit 23 selects one of plural frequency bands to be used in the communication system 1. In the present embodiment, the management control unit 23 selects one (for example, the first frequency band) from among the first frequency band and the second frequency band.

In S125, the management control unit 23 sets the wireless communication unit 22 to transmit the communication signal in the frequency band selected in S120. Here, when the first frequency band is selected in S120, the management control unit 23 outputs an execution instruction to the switching unit 65 to put the wireless communication unit 22 in the first transmission state. On the other hand, when the second frequency band is selected in S120, the management control unit 23 outputs an execution instruction to the switching unit 65 to put the wireless communication unit 22 in the second transmission state. Accordingly, the wireless communication unit 22 switches to the first transmission state or the second transmission state according to the switch signal from the switching unit 65.

In S130, the management control unit 23 uses the wireless communication unit 22 to transmit a test signal to the terminal device X4 using the frequency band selected in S120. The test signal is a communication signal in the frequency band selected in S120, and is a signal for causing the terminal device 4 to transmit a communication signal including reception state information. The reception state information represents a reception intensity of a communication signal of each of the plural frequency bands used in the communication system 1 (that is, the frequency band selected in S120 in the above context), and is a communication signal transmitted from the management device 2 to the terminal device X4. Note that, hereinafter, the reception intensity of the communication signal of each of the plural frequency bands, which is the communication signal transmitted from the management device 2 to the terminal device X4, at the terminal device X4 (i.e., when received by a certain/relevant terminal device X4) may also be referred to as terminal side intensity information.

Then, the management control unit 23 sets the wireless communication unit 22 to receive the communication signal in the frequency band selected in S120 after transmitting the test signal. Here, for example, when the first frequency band is selected in S120, the management control unit 23 outputs an execution instruction to the switching unit 65 to put the wireless communication unit 22 in the first reception state. On the other hand, for example, when the second frequency band is selected in S120, the management control unit 23 outputs an execution instruction to the switching unit 65 to put the wireless communication unit 22 in the second reception state. Thereby, the wireless communication unit 22 switches to the first reception state or to the second reception state according to the switch signal from the switching unit 65.

In S135, the management control unit 23 waits until a wireless communication signal in the frequency band selected in S120 and including the reception state information is received from the terminal device X4, and when the wireless communication signal is received, proceeds the process to S140.

In S140, the management control unit 23 acquires the reception state information included in the wireless communication signal received from the terminal device X4, and stores it in the memory 27. The management control unit 23 may store the information indicating the frequency band selected in S120 and the reception state information in the memory 27 in association with each other.

In S145, the management control unit 23 determines whether or not the process of acquiring the reception state information from the terminal device X4 has been complete for all the frequency bands used in the communication system 1. The management control unit 23 shifts the process to S150 when it is determined that the process is complete for all the frequency bands. On the other hand, when it is determined that the process has not been complete for all frequency bands, the management control unit 23 shifts (i.e., returns) the process to S120. The management control unit 23 repeats the process of S120 to S145 using the frequency band for which the process has not been complete (for example, for the second frequency band).

In the present embodiment, the management control unit 23 shifts the process to S150 when it is determined that the process of S120 to S145 has been complete for both of the first frequency band and the second frequency band.

In S150, the management control unit 23 stores, in the memory 27, as an updated frequency band, the frequency band in which a high reception intensity is acquired from among the plural frequency bands for the terminal device X4 based on the reception state information. For example, from among the plural frequency bands, a frequency band in which a highest reception intensity is acquired is stored in the memory 27 as the updated frequency band.

In S155, the management control unit 23 uses the wireless communication unit 22 to transmit, to the terminal device X4, a wireless communication signal (hereinafter, an update signal) including at least update information indicating the updated frequency band. The frequency band used for transmitting the update signal may be, for example, the used frequency band having been used immediately before the process proceeds to S150. A similar process may be used for each channel in each frequency band.

In S160, the management control unit 23 associates the terminal device X4 selected in S115 with the updated frequency band, and stores them in the memory 27. In other words, in S160, the management control unit 23 updates the used frequency band for the terminal device X4 to the one having a high reception intensity, based on the reception state information described above, by selecting a band having a high reception intensity from among the plural frequency bands used in the communication system 1. A similar process may be used for each channel in each frequency band.

In S165, the management control unit 23 determines whether or not the process of S115 to S160 has been executed for all the terminal devices 4. Here, when it is determined that the above process has not been executed for all the terminal devices 4, the management control unit 23 shifts (i.e., returns) the process to S115. Then, the management control unit 23 repeats the process of S115 to S160 for the remaining terminal devices 4.

On the other hand, when it is determined that the above process has been executed for all the terminal devices 4, the management control unit 23 shifts the process to S170. By the time of shifting the process to S170, the memory 27 stores the correspondence information for all the terminal devices 4. In the present embodiment, the correspondence information in which the identification information of each of the plural terminal devices 4 and one of the first frequency band and the second frequency band as the used frequency band are associated with each other is stored in the memory 27.

The management control unit 23 executes a process for acquiring the battery information from the terminal device 4 in S170 to S185, which is performed when the update timing is not reached. In S170, the management control unit 23 selects one (for example, the first frequency band) from among the plural frequency bands used in the communication system 1.

Then, the management control unit 23 sets the wireless communication unit 22 to transmit the wireless communication signal in the selected frequency band. That is, the management control unit 23 outputs to the switching unit 65 an execution instruction for setting the communication state of the wireless communication unit 22. Thereby, in the present embodiment, the wireless communication unit 22 switches to the first transmission state or to the second transmission state according to the switch signal from the switching unit 65.

In S175, the management control unit 23 identifies a terminal device 4 that uses a frequency band selected in S170 as the used frequency band, based on the correspondence information stored in the memory 27. Then, the management control unit 23 uses the wireless communication unit 22 to transmit the transmission instruction signal of the frequency band selected in S170 to the terminal device 4, which uses a frequency band selected in S170 as the used frequency band. The transmission instruction signal is a wireless communication signal in the frequency band selected in S170, and is a wireless communication signal including transmission instruction information. The transmission instruction information is information including at least (i) an instruction to transmit, to the management device 2, the battery information that the terminal device 4 periodically acquires and (ii) the identification information of the terminal device 4 that is a target of such instruction.

Then, the management control unit 23 sets the wireless communication unit 22 to receive the wireless communication signal in the frequency band selected in S170 after transmitting the transmission instruction signal. That is, the management control unit 23 outputs to the switching unit 65 an execution instruction for setting the communication state of the wireless communication unit 22.

In S180, the management control unit 23 receives a transmission response signal as a response to the transmission instruction signal from the terminal device 4 whose used frequency band is the frequency band selected in S170. The transmission response signal is a wireless communication signal in the frequency band selected in S170, and is a wireless communication signal including at least the battery information acquired by the terminal device 4. Note that the transmission response signal may include, in addition to the battery information, the identification information of the terminal device 4 that has acquired the battery information (that is, the terminal device 4 that is a transmission source of the transmission response signal).

The management control unit 23 stores the battery information received from the terminal device 4 in the memory 27. In S185, the management control unit 23 determines whether or not the process of S170 to S185 have been complete for all the frequency bands used in the communication system 1.

Here, when it is determined that the process has not been complete for all frequency bands, the management control unit 23 shifts (i.e., returns) the process to S170. Then, the management control unit 23 repeats the process of S170 to S185 using the frequency band for which the process has not been complete (for example, the second frequency band). On the other hand, when it is determined that the process has been complete for all frequency bands, the management control unit 23 ends the present process.

<2. 2 Process Executed by the Terminal Control Unit 43>

In FIG. 8, the process executed by the terminal control unit 43 is described with reference to a flowchart. The terminal control unit 43 repeatedly executes the process at a predetermined cycle (that is, the above-mentioned terminal management cycle). The terminal control unit 43 executes a process for an acquisition of the acquired battery information by the management device 2. However, when the management device 2 determines that it is the update timing, the terminal control unit 43 executes a process for updating the used frequency band by the terminal device 4.

In S205, the terminal control unit 43 sets the wireless communication unit 42 to receive the wireless communication signal in the used frequency band of the terminal device 4. That is, the terminal control unit 43 outputs to the switching unit 75 an execution instruction for setting the communication state of the wireless communication unit 42. The used frequency band of the terminal device 4 is stored in the memory 47 as described above.

In S210, the terminal control unit 43 determines whether or not a start signal has been received from the management device 2. For example, the terminal control unit 43 may determine that the start signal has been received from the management device 2 when the above-mentioned start information and the identification information of the terminal device 4 are included in the received wireless communication signal. The terminal control unit 43 shifts the process to S215 when determining that the start signal has been received, and shifts the process to S265 when determining that the start signal has not yet been received.

The terminal control unit 43 executes a process for updating the used frequency band of the terminal device 4 in S215 to S260. In S215, the terminal control unit 43 selects one of the plural frequency bands used in the communication system 1. In the present embodiment, the terminal control unit 43 selects one (for example, the first frequency band) from among the first frequency band and the second frequency band.

In S220, the terminal control unit 43 sets the wireless communication unit 42 to receive the wireless communication signal in the frequency band selected in S215. That is, the terminal control unit 43 outputs to the switching unit 75 an execution instruction for setting the communication state of the wireless communication unit 42.

In S225, the terminal control unit 43 waits until the test signal is received from the management device 2 in the frequency band selected in S215, and when the test signal is received, the process proceeds to S230.

In S230, the terminal control unit 43 acquires the reception intensity of the test signal received from the management device 2 as the reception state information. Note that the reception state information mentioned here is the above-mentioned terminal side intensity information. The reception intensity is stored in the memory 47 by the reception intensity detection unit 74.

In S235, the terminal control unit 43 sets the wireless communication unit 42 to transmit the wireless communication signal in the frequency band selected in S215. That is, the terminal control unit 43 outputs to the switching unit 75 an execution instruction for setting the communication state of the wireless communication unit 42.

Then, the terminal control unit 43 transmits, to the management device 2 by using the wireless communication unit 42, a wireless communication signal of the frequency band selected in S215 and including the reception state information. In S240, the terminal control unit 43 determines whether or not the process of transmitting the reception state information to the management device 2 is complete for all the frequency bands used in the communication system 1 (that is, S215 to S235). The terminal control unit 43 shifts the process to S245 when it is determined that the process is complete for all the frequency bands. On the other hand, when it is determined that the process has not yet been complete for all the frequency bands, the terminal control unit 43 shifts (i.e., returns) the process to S215. The terminal control unit 43 repeats the process of S215 to S240 by using the frequency band for which the process is not complete (for example, the second frequency band).

In S245, the terminal control unit 43 waits until the update signal is received from the management device 2, and after receiving the update signal from the management device 2, shifts the process to S250. In S250, the terminal control unit 43 acquires the update information included in the update signal. The updated frequency band is identified by the update information.

In S255, the terminal control unit 43 stores, in the memory 47 as a new used frequency band, the updated frequency band represented by the update information. In S260, the terminal control unit 43 sets the wireless communication unit 42 to receive the wireless communication signal of the used frequency band updated in S255. That is, the terminal control unit 43 outputs to the switching unit 75 an execution instruction for setting the communication state of the wireless communication unit 42.

In step S265, the terminal control unit 43 waits until the transmission instruction signal is received from the management device 2, and when it is determined that the transmission instruction signal is received, the process proceeds to step S270. The terminal control unit 43 acquires the battery information in S270. The battery information is acquired by the battery information acquisition unit 71 and is stored in the memory 47.

The terminal control unit 43 transmits a transmission response signal to the management device 2 in S275. Then, the terminal control unit 43 ends the present process.

<Operation>

The management device 2 and each of the terminal devices 4 transmit and receive the battery information at a predetermined cycle. At the time of transmission or reception, wireless communication is performed using the used frequency bands respectively stored in the memory 27 included in the management device 2 and the memory 47 included in the terminal device 4.

When it is determined that it is an update timing, the management device 2 acquires the reception state information (i.e., the terminal side intensity information) in the management device 2 by using the plural frequency bands used in the communication system 1. The management device 2 compares the respective reception intensities of the plural frequency bands used in the communication system 1, identifies a frequency band having the highest reception intensity from among the plural frequency bands used in the communication system 1, and updates the used frequency band to the identified frequency band. The management device 2 stores the specified used frequency band in the memory 27. Further, the management device 2 transmits the information indicating the identified used frequency band to the terminal device 4, and stores the information in the memory 47 of the terminal device 4.

Thereby, the transmission or reception of the battery information is continued between the management device 2 and each terminal device 4 in a good communication state.

[3. Effects]

According to the first embodiment described in detail above, the following effects are achievable.

(A) The communication system 1 of the present embodiment includes one management device 2 and plural terminal devices 4. Hereinafter, a communication device that communicates using plural, different frequency bands is referred to as a multi-band communication device. One management device 2 includes a wireless communication unit 22 as a multi-band communication device, and each of the plural terminal devices 4 includes a wireless communication unit 42 as a multi-band communication device. That is, in the communication system 1, the management device 2 and the terminal device 4 can communicate with each other using plural, different frequency bands.

In the communication system 1 of the present embodiment, when the communication state using a certain frequency band among the plural frequency bands is deteriorated, a frequency band different from the frequency band in which the communication state is deteriorated is used for communication between the management device 2 and the terminal device 4. For example, a good communication state can be acquired by changing a currently-used frequency band to a different, lower frequency band. The good communication state here means that communication accuracy is equal to or higher than a predetermined value, for example. As a result, in the communication system 1, the management device 2 can continuously acquire the battery information regardless of the communication state with the terminal device 4.

For example, it is assumed that a battery system including a terminal management device that acquires information about a battery and an intermediate management device that wirelessly communicates with the terminal management device, as known in the related art, is arranged in a housing made of metal or the like. These devices communicate by using a wireless communication signal in one frequency band. Depending on the positions and distance between the intermediate management device and the terminal management device, or the shape and size of the housing, the communication state between the intermediate management device and the terminal management device may deteriorate. Such deterioration of the communication state can also be caused by the arrangement of batteries, external noise, and the like. In other words, if the distance between the intermediate management device and the terminal management device increases and/or if another object is put in a hollow space of the housing (that is, an obstacle for performing wireless communication) due to space afforded in the housing, it may cause difficulty in communication by using a wireless communication signal in one frequency band.

Note that the deterioration of the communication state here means, for example, a state in which the communication accuracy, which is a numerical value indicating a quality of the communication state, is less than a predetermined value. For example, the communication accuracy may be a communication success rate that represents a rate of successful communication between the management device 2 and the terminal device 4.

On the other hand, the communication system 1 of the present embodiment can acquire a good communication state even when the communication state in a frequency band being used is deteriorated. (B) As shown in FIGS. 1 and 2, the plural terminal devices 4 may include at least one first terminal device 4a and at least one second terminal device 4b. The second terminal device 4b may be arranged on a far side from the management device 2 than the first terminal device 4a.

The first terminal device 4a may be configured such that the wireless communication unit 42 performs communication using the first frequency band that is relatively high among the plural frequency bands used in the communication system 1. The first terminal device 4a may be configured as described above, for example, in an initial state or the like. That is, the first frequency band may be stored in the memory 47 as the used frequency band and the main switch 225 in the wireless communication unit 42 included in the first terminal device 4a may be configured to select the first filter 223.

Further, the second terminal device 4b may be configured such that the wireless communication unit 42 has, for use in communication, a second, lower frequency band than the used frequency band in the first terminal device 4a among the plural frequency bands used in the communication system 1. The second terminal device 4b may be configured as described above, for example, in an initial state. That is, the second frequency band may be stored in the memory 47 as the used frequency band, and the main switch 225 in the wireless communication unit 42 included in the second terminal device 4b may be configured to select the second filter 224.

As a result, the second terminal device 4b arranged on the far side from the management device 2 performs communication using a relatively low frequency band. That is, the degree of diffraction is larger and the radio wave is less likely to be attenuated than when communication is performed using a relatively high frequency band. As a result, it is possible to acquire a better communication state with respect to the second terminal device 4b arranged on the far side from the management device 2 than in case where communication is performed using a relatively high frequency band.

Note that, in such case, regarding the first terminal device 4a arranged on a near side closer to the management device 2, even if communication is performed using a relatively high frequency band in which the degree of diffraction is small, the distance is small in the first place and radio waves are not easily attenuated. Therefore, the communication state between the management device 2 and the first terminal device 4a is maintainable in good condition.

Further, in the communication system 1, the management device 2 can continuously acquire the battery information regardless of the communication state with the first terminal device 4a and with the second terminal device 4b. Here, a distance L1 between the first terminal device 4a and the management device 2 described above may be a value based on distances between the respective, plural terminal devices 4 included in the first terminal device 4a and the management device 2. For example, the distance L1 may be an average value, a median value, a minimum value, or a maximum value of the distances between the respective terminal devices 4 included in the first terminal device 4a and the management device 2.

On the other hand, similarly, a distance L2 between the second terminal device 4b and the management device 2 described above may be a value based on distances between the respective, plural terminal devices 4 included in the second terminal device 4b and the management device 2. For example, the distance L2 may be an average value, a median value, a minimum value, or a maximum value of the distances between the respective terminal devices 4 included in the second terminal device 4b and the management device 2.

Figure 9:
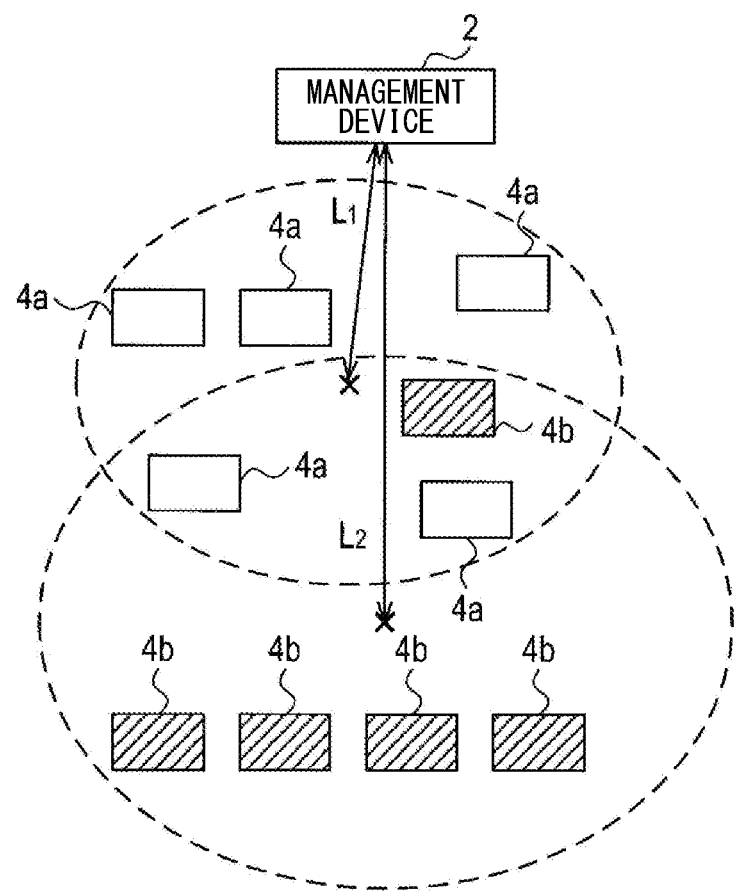
FIG. 9 is an explanatory diagram of a distance between the management device and the terminal device.

Alternatively, as shown in FIG. 9, the distance L1 may possibly be a distance between the management device 2 and a central position of the respective positions of the terminal devices 4 included in (i.e., collectively mentioned as) the first terminal device 4a. Similarly, the distance L2 may possibly be a distance between the management device 2 and a central position of the respective positions of the terminal devices 4 included in (i.e., collectively mentioned as) the second terminal device 4b.

Thereby, even if the respective terminal devices 4 included in the first terminal device 4a or in the second terminal device 4b are arranged at different positions apart from each other (for example, as shown in FIG. 9), all of the terminal devices 4 in a 4a device group (as the first terminal device 4a) use the lower frequency band. Therefore, the same effects as described above can be achievable.

(C) Each of the plural terminal devices 4 includes the memory 47 that stores the used frequency band. The management device 2 includes the memory 27 that stores the used frequency band for each of the plural terminal devices 4. In S140, the management device 2 (that is, the update unit 62) acquires at least one of management side intensity information and the terminal side intensity information as the reception state information. Note that the management side intensity information represents a reception intensity of a wireless communication signal (i.e., signal intensity at a time of reception by the management device 2) of each of the plural, different frequency bands used by the communication system 1, which is a wireless communication signal transmitted from each of the plural terminal devices 4 to the management device 2.

In S150, the management device 2 updates, for each of the plural terminal devices 4, the used frequency band to a frequency band in which the highest reception intensity is acquired among the plural, different frequency bands used by the communication system 1 based on the reception state information.

In the present embodiment, the management device 2 acquires the terminal side intensity information as the reception state information in S140, and updates the used frequency band for each of the plural terminal devices 4 based on such terminal side intensity information in S150. Further, the management control unit 23 updates the used frequency band to a frequency band in which the highest reception intensity is acquired among the plural, different frequency bands used by the communication system 1, based on the reception state information.

In such manner, even if a quality of the communication state between the management device 2 and the terminal device 4 changes, a frequency band in which the reception intensity in the management device 2 or in the terminal device 4 is the highest is determined as the used frequency band. That is, it is possible to acquire a good communication state between the management device 2 and each of the terminal devices 4. Thus, in the communication system 1, the same effects as described above can be achievable as a system.

(D) In the management device 2, the management control unit 23 determines in S110 that it is the update timing when the update condition is satisfied. The management control unit 23 (that is, the update unit 62) updates the used frequency band for each of the plural terminal devices 4 when it is determined that the update timing is reached. In the present embodiment, the communication system 1 is mounted on the vehicle V1. Then, in S110, the management control unit 23 determines that the update timing is reached when the vehicle V1 stops, i.e., by considering a stop of the vehicle V1 as a satisfaction of the update condition.

Wireless communication in the vehicle V1 may be affected by various noises, such as in-vehicle noise due to vibrations and out-of-vehicle noises due to changes in travel environment. The communication state in the vehicle V1 may thus be deteriorated.

In the communication system 1 of the present embodiment, the used frequency band of each terminal device 4 is updated based on the reception state information at the timing when the vehicle V1 is stopped. Therefore, wireless communication between the management device 2 and the terminal device 4 is performable in the housing 100 by using a frequency band in which a higher reception intensity is achievable.

[4. Modifications]

In the above-described embodiment, the wireless communication unit 22 (hereinafter, a wireless communication unit 22A) is configured as shown in FIG. 4, but the present disclosure is not limited to such an example.

<Modification 1>

Figure 10:
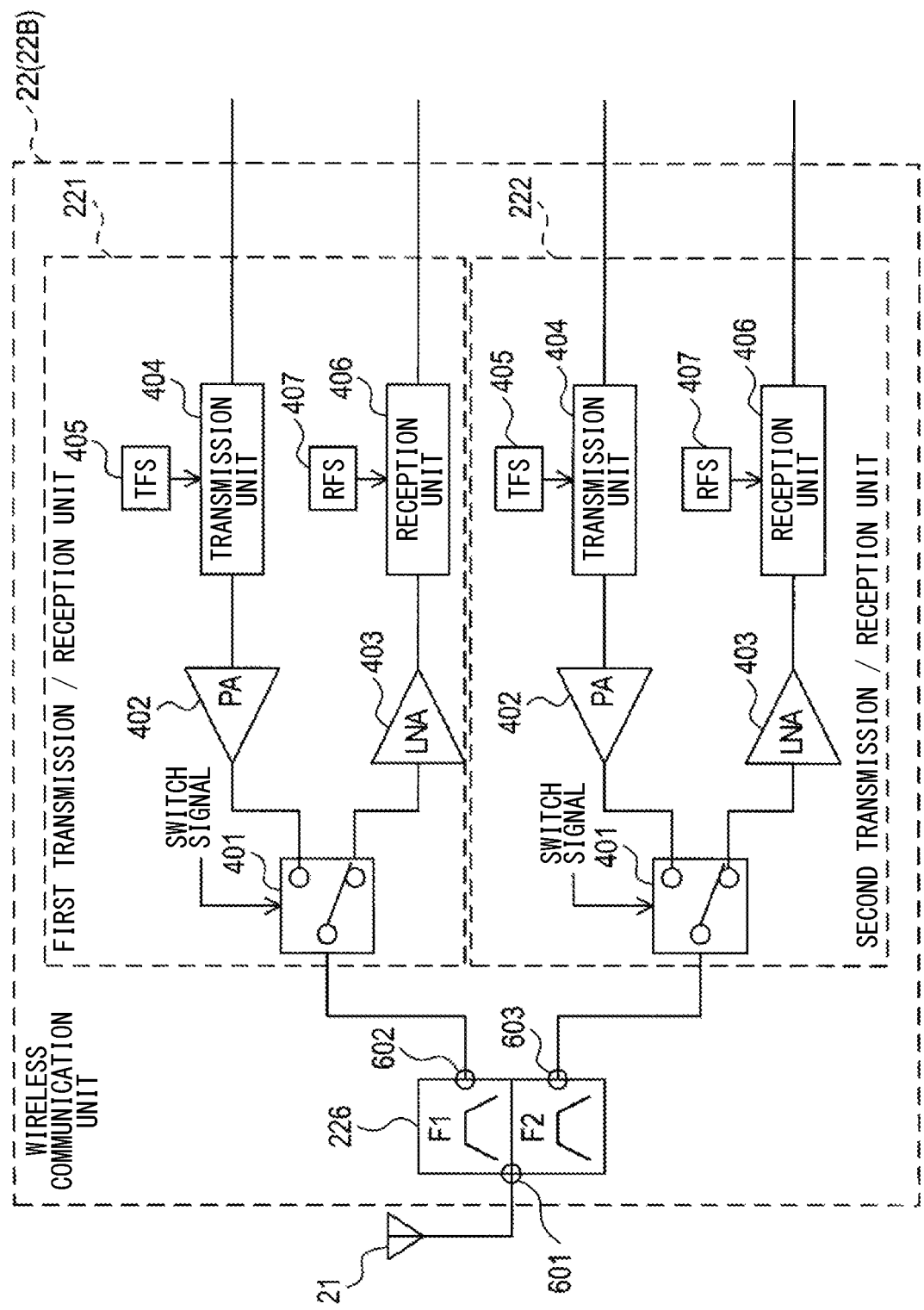
FIG. 10 is a block diagram of a configuration of the wireless communication unit according to a modification 1.

In FIG. 10, the wireless communication unit 22 (hereinafter, a wireless communication unit 22B) of Modification 1 may be configured as shown. In the wireless communication unit 22B of Modification 1 illustrated in FIG. 10, the first filter 223, the second filter 224, and the main switch 225 included in the wireless communication unit 22A illustrated in FIG. 4 may be replaced with a diplexer 226.

The diplexer 226 is a three-terminal filter positioned at an entrance from the antenna 21 (that is, at an exit to the antenna 21) and separating two frequency bands used in the communication system 1. The diplexer 226 includes terminals 601 to 603. The terminal 603 is connected to the antenna 21. The terminal 602 is connected to the transceiver switch 401 in the first transceiver 221. The terminal 603 is connected to the transceiver switch 401 in the second transceiver 222.

In Modification 1, when the switching unit 65 switches the wireless communication unit 22B to the above-described four states, due to the change in the configuration of the wireless communication unit 22B, output of the switch signal from the switching unit 65 to the main switch 225 is omitted, which is different from the first embodiment.

According to such configuration, since the switch signal input to the main switch 225 is not necessary, the number of control signals can be reduced and the control by the management control unit 23 can be simplified. The wireless communication unit 42 (hereinafter, a wireless communication unit 42B) can be configured similarly to the wireless communication unit 22B. However, a terminal 601 of the diplexer 226 included in the wireless communication unit 42B is connected to the antenna 41 instead of the antenna 21. In the wireless communication unit 42B, the transceiver switch 401 in the first transceiver 221 and the transceiver switch 401 in the second transceiver 222 respectively select terminals to be connected according to the switch signal from the terminal control unit 43.

<Modification 2>

Figure 11:
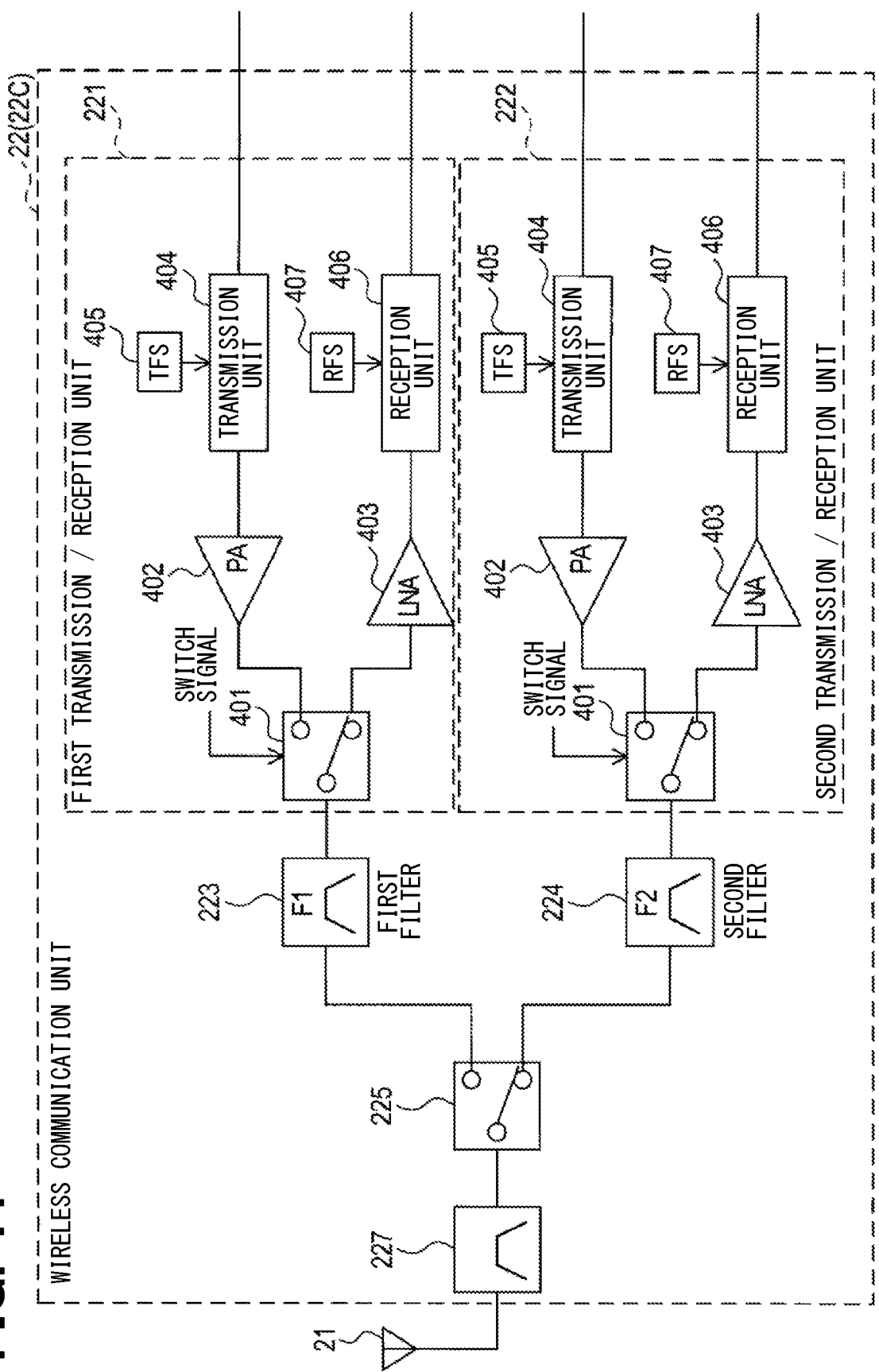
FIG. 11 is a block diagram of a configuration of the wireless communication unit according to a modification 2.

In FIG. 11, the wireless communication unit 22 (hereinafter, a wireless communication unit 22C) in Modification 2 may be configured as shown. The wireless communication unit 22C of Modification 2 illustrated in FIG. 11 further includes a filter 227 positioned between the main switch 225 in the wireless communication unit 22A illustrated in FIG. 4 and the antenna 21. The filter 227 has two terminals. One of the two terminals of the filter 227 is connected to the antenna 21, and the other terminal is connected to the main switch 225. In the present embodiment, the filter 227 may be a BPF that passes the first frequency band and the second frequency band.

With such a change, one of the three terminals of the main switch 225 in the wireless communication unit 22C is connected to the above-described filter 227 instead of the antenna 21. In Modification 2, the switching unit 65 outputs the switch signal when switching the wireless communication unit 22C to the above-described four states, as in the first embodiment.

In the housing 100, when the radio waves of the designated frequencies in the plural frequency bands used in the communication system 1 are reflected by the inner wall of the housing 100, harmonics may be generated with respect to the radio waves of the designated frequency. These harmonics may deteriorate the communication state between the management device 2 and the terminal device 4 as noise.

In Modification 2, since the filter 227 that passes the first frequency band and the second frequency band (i.e., that covers a frequency range including the first and second frequency band) is provided, harmonics and out-of-band noise due to radio waves of the designated frequency are suppressed. That is, it suppresses deterioration of the communication state between the management device 2 and the terminal device 4.

The wireless communication unit 42 can also be configured similarly to the wireless communication unit 22C.

<Modification 3>

Figure 12:
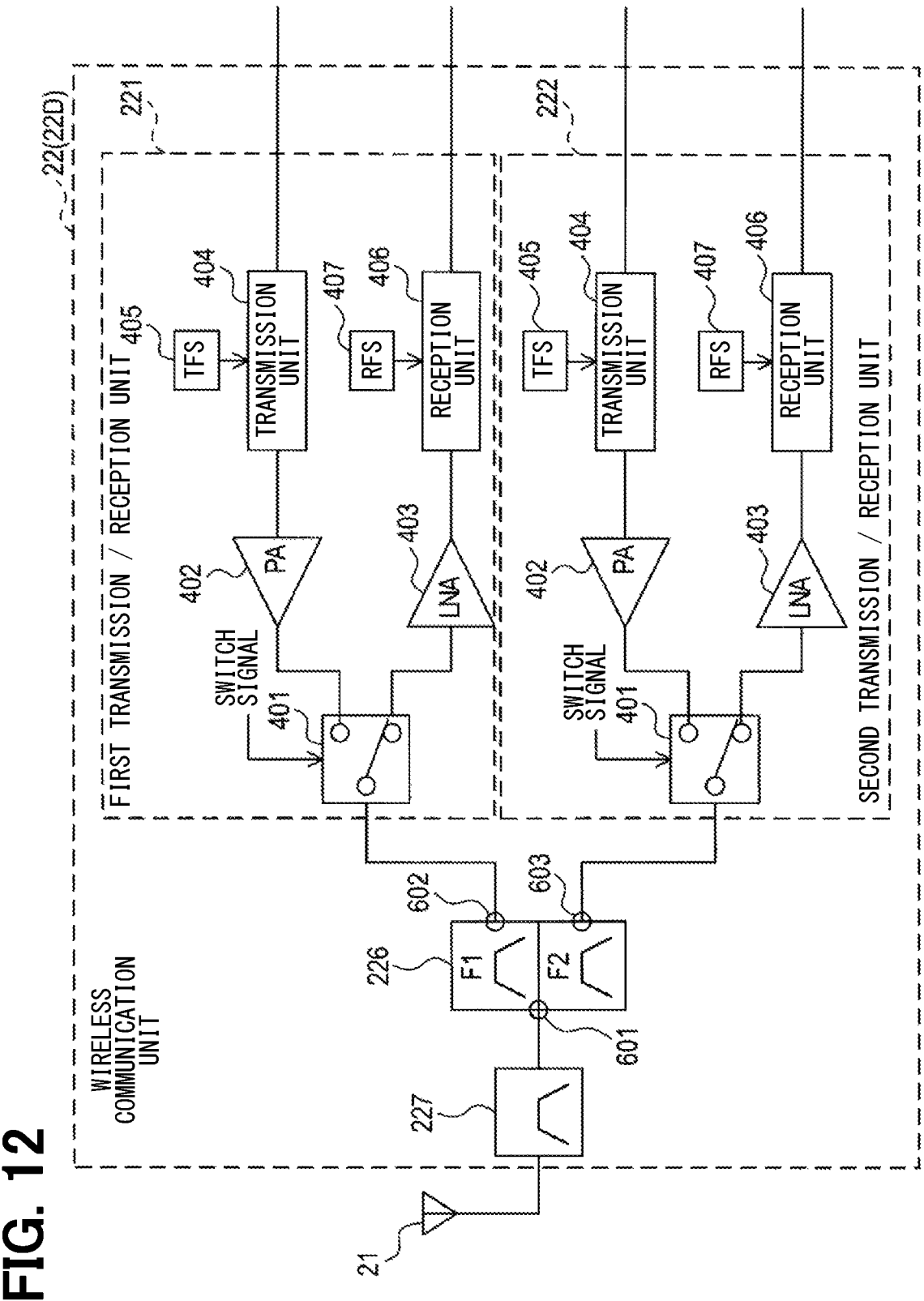
FIG. 12 is a block diagram of a configuration of the wireless communication unit according to a modification 3.

The wireless communication unit 22 (hereinafter, a wireless communication unit 22D) in Modification 3 may be configured as shown in FIG. 12, for example. The wireless communication unit 22D of Modification 3 illustrated in FIG. 12 further includes the filter 227 similar to that of Modification 2 at a position between the diplexer 226 in the wireless communication unit 22B of Modification 1 illustrated in FIG. 10 and the antenna 21. The filter 227 has two terminals. One of the two terminals of the filter 227 is connected to the antenna 21, and the other terminal is connected to the terminal 601 of the diplexer 226.

Thereby, the same effects as those of Modification 2 are achievable. The wireless communication unit 42 can also be configured similarly to the wireless communication unit 22D.

<Modification 4>

Of the management device 2 and the terminal device 4, at least the management device 2 may include plural antennas.

Figure 13:
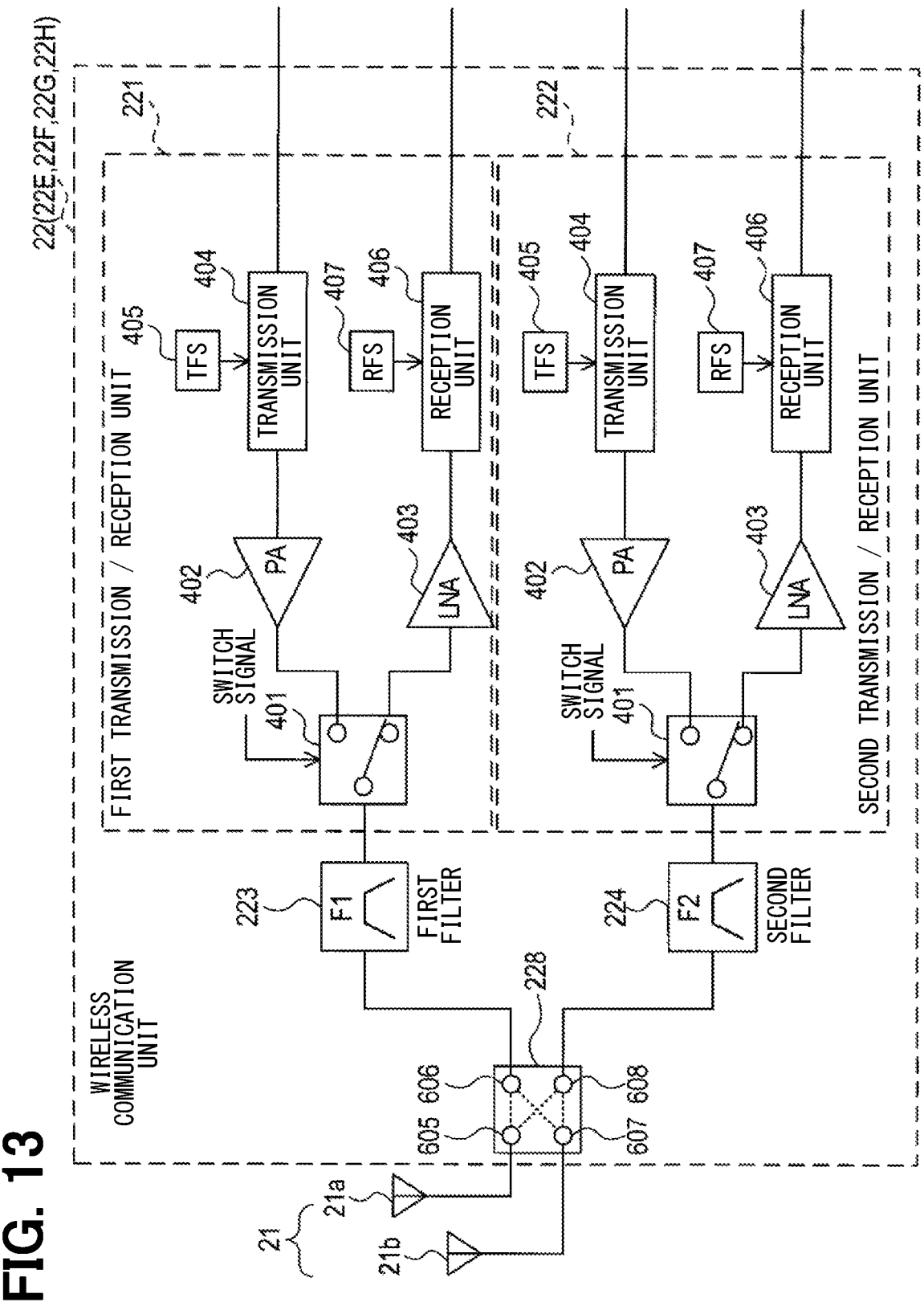
FIG. 13 is a block diagram of a configuration of the wireless communication unit according to modifications 4-7.

For example, in Modifications 4 to 7 below, as shown in FIG. 13, only the management device 2 may include plural antennas. That is, the antenna 21 may include plural antennas, and the plural antennas 21 may include an antenna 21a and an antenna 21b.

Accordingly, in Modifications 4 to 7, as illustrated in FIG. 13, the main switch 225 included in the wireless communication unit 22A of the first embodiment illustrated in FIG. 4 may be replaced with a switch 228. The switch 228 is a four terminal switch with terminals 605 to 608. For example, the terminal 605 is connected to the antenna 21a and the terminal 606 is connected to the first filter 223. The terminal 607 is connected to the antenna 21b, and the terminal 608 is connected to the second filter 224.

The switch 228 can acquire the following connection state according to the switch signal from the switching unit 65. The connection state mentioned here may include a state in which the terminal 605 and the terminal 606 are connected, a state in which the terminal 605 and the terminal 608 are connected, a state in which the terminal 605, the terminal 606, and the terminal 607 are connected, and a state in which the terminal 605, the terminal 606 and the terminal 608 are connected. In addition, the connection state mentioned here may further include a state in which the terminal 607 and the terminal 606 are connected, a state in which the terminal 607 and the terminal 608 are connected, a state in which the terminal 607, the terminal 606, and the terminal 608 are connected, and a state in which the terminal 607, the terminal 608 and the terminal 605 are connected.

More specifically, in the wireless communication unit 22 of Modification 4 (hereinafter, a wireless communication unit 22E), for example, the antenna 21a may be a transmission antenna for transmitting radio waves in the first frequency band and radio waves in the second frequency band. The antenna 21b may be a reception antenna that receives radio waves in the first frequency band and radio waves in the second frequency band.

For example, the switch 228 may alternatively select one of two states according to the switch signal from the switching unit 65, i.e., (i) a state of connecting the terminal 605 and the terminal 606 and connecting the terminal 607 and the terminal 608, and (ii) a state of connecting the terminal 605 and the terminal 608 and connecting the terminal 607 and the terminal 606.

In Modification 4, when the switching unit 65 switches the wireless communication unit 22E to the above-described four states, due to the change in the configuration of the wireless communication unit 22E, the switching unit 65 outputs a switch signal to the switch 228 instead of outputting the signal to the main switch 225. Note, modifications 5-7, discussed below, correspond to communication units 22F-H respectively.

Here, when an execution instruction for setting the first transmission state or the second reception state is input, the switching unit 65 outputs a switch signal to the switch 228, for establishing a state of connecting the terminal 605 and the terminal 606 and connecting the terminal 607 and the terminal 608. On the other hand, when an execution instruction for setting the first reception state or the second transmission state is input, the switching unit 65 outputs a switch signal to the switch 228, for establishing a state of connecting the terminal 605 and the terminal 608 and connecting the terminals 607 and the terminal 606.

In Modification 4, the switch 228 enables, simultaneously, (i) transmission of one of the first frequency band and the second frequency band and (ii) reception of the other of the first frequency band and the second frequency band. The wireless communication unit 42 can also be configured similarly to the wireless communication unit 22E.

<Modification 5>

In the wireless communication unit 22 (hereinafter, a wireless communication unit 22F) of Modification 5, the antenna 21a may be an antenna that transmits and receives radio waves in the first frequency band. Further, the antenna 21b may be an antenna that transmits and receives radio waves in the second frequency band.

For example, the switch 228 may alternatively select one of two states according to the switch signal from the switching unit 65, i.e., (i) a state of connecting the terminal 605 and the terminal 606 and not connecting the terminal 607 and the terminal 608, and (ii) a state of connecting the terminal 607 and the terminal 608 and not connecting the terminal 605 and the terminal 606.

Here, when an execution instruction for setting the first transmission state or the first reception state is input, the switching unit 65 outputs a switch signal to the switch 228, for establishing a state of connecting the terminal 605 and the terminal 606, and not connecting the terminals 607 and the terminal 608. On the other hand, when an execution instruction to set the second transmission state or the second reception state is input, the switching unit 65 outputs a switch signal to the switch 228, for establishing a state of connecting the terminal 607 and the terminal 608 and not connecting the terminal 605 and the terminal 606.

In Modification 5, since an antenna is provided for each of the used frequency bands in the communication system 1, the directivity of the antenna can be individually set according to each of the used frequency bands. The wireless communication unit 42 can also be configured similarly to the wireless communication unit 22F.

Note that, in Modification 5, the switch 228 may be configured such that the terminal 605 and the terminal 606 are always connected and the terminal 607 and the terminal 608 are always connected according to the switch signal.

<Modification 6>

In the wireless communication unit 22 (hereinafter, a wireless communication unit 22G) of Modification 6, the antenna 21a may be an antenna that transmits and receives radio waves in the first frequency band and the second frequency band. The antenna 21b may also be an antenna that transmits and receives radio waves in the first frequency band and the second frequency band.

For example, the switch 228 alternatively selects, according to the switch signal from the switching unit 65, (i) a state in which the terminal 605, the terminal 606, and the terminal 607 are connected and (ii) a state in which the terminal 607, the terminal 608, and the terminal 605 are connected.

Here, when an execution instruction for setting the first transmission state or the first reception state is input, the switching unit 65 outputs a switch signal to the switch 228 for connecting the terminals 605, 606, and 607. As a result, the terminals 606 and 605 are connected, and the terminals 606 and 607 are connected. On the other hand, when an execution instruction for setting the second transmission state or the second reception state is input, the switching unit 65 outputs a switch signal to the switch 228 for connecting the terminals 607, 608, and 605. As a result, the terminal 608 and the terminal 607 are connected, and the terminal 608 and the terminal 605 are connected.

In Modification 6, in a manner similar to the MIMO method, for example, transmission data is pre-divided into plural signals and the plural signals are simultaneously transmitted from the plural antennas 21a, 21b in the same frequency band, thereby improving a communication speed.

The wireless communication unit 42 can also be configured similarly to the wireless communication unit 22G.

<Modification 7>

In the wireless communication unit 22 (hereinafter, a wireless communication unit 22H) of Modification 7, the antenna 21a may be an antenna that transmits and receives radio waves in the first frequency band and the second frequency band, as in Modification 6. The antenna 21b may also be an antenna that transmits and receives radio waves in the first frequency band and the second frequency band.

For example, the switch 228 alternatively selects one of two states, i.e., (i) a state in which the terminals 605, 606, and 608 are connected and (ii) a state in which the terminals 607, 606, and 608 are connected, according to a switch signal from the switching unit 65.

Here, when the switching unit 65 switches the wireless communication unit 22H to ((one of)) the above-described four states, the switching unit 65 may always output, to the switch 228, a switch signal for connecting the terminal 605, the terminal 606, and the terminal 608. Thereby, for example, (A) the terminal 606 and the terminal 605 may be connected and the terminal 606 and the terminal 608 may be connected, or (B) the terminal 605 and the terminal 606 may be connected and the terminal 605 and the terminal 608 may be connected. That is, either one of the two states (A) and (B) may be established.

Alternatively, when switching the wireless communication unit 22H to the above-described four states, the switching unit 65 may always output, to the switch 228, a switch signal that connects the terminals 607, 606, and 608. Thereby, for example, (C) the terminal 606 and the terminal 607 may be connected and the terminal 606 and the terminal 608 may be connected, or (D) the terminal 607 and the terminal 606 may be connected and the terminal 607 and the terminal 608 may be connected. That is, either one of the two states (C) and (D) may be established.

In Modification 7, for example, when the communication state of the antenna 21a is deteriorated, it is possible to continue the communication by using the antenna 21b instead of the antenna 21a. The wireless communication unit 42 can also be configured similarly to the wireless communication unit 22H.

2. Other Embodiments

Although the embodiments of the present disclosure have been described above, the present disclosure is not limited to the embodiments described above, and various modifications can be made to implement the present disclosure.

(5a) In the above embodiments, the communication system 1 includes one management device 2 and plural terminal devices 4, but the present disclosure is not limited to such a configuration. For example, a communication system according to the present disclosure may include one management device 2 and one terminal device 4.

Alternatively, a communication system according to the present disclosure may include plural management devices 2 and one terminal device 4.

(5b) A communication system according to the present disclosure may include at least one terminal device that acquires at least battery information and at least one management device that communicates with the terminal device, and one of the management device and the terminal device may have a multi-band communication device. The other of the management device and the terminal device may include a specific communication device. The specific communication device refers to a communication device configured to perform communication using at least one frequency band among plural frequency bands used in the communication system.

Figure 14:
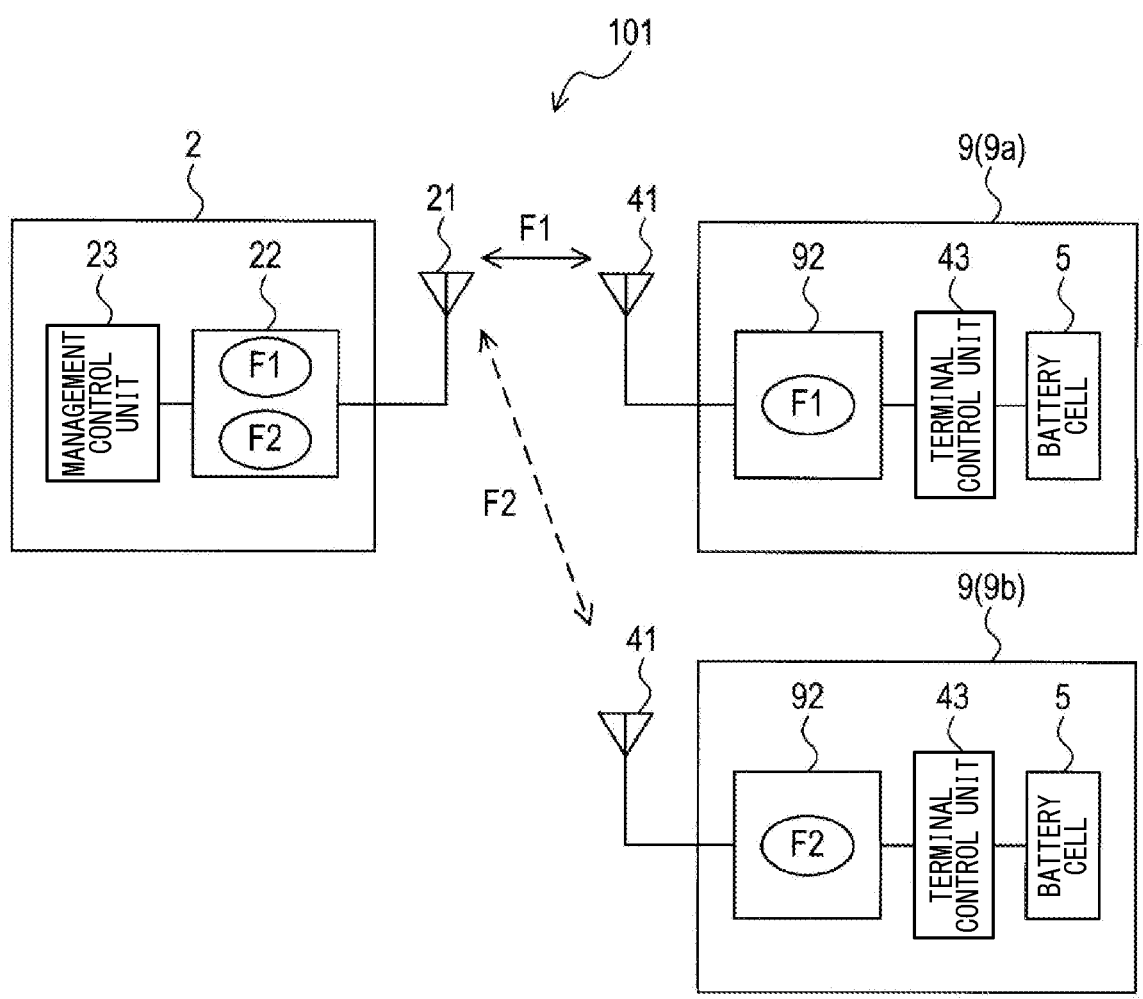
FIG. 14 is a block diagram of a configuration of the communication system according to another embodiment 5b.

For example, a communication system 101 according to the present disclosure may include the management device 2 including a multi-band communication device and a terminal device 9, as illustrated in FIG. 14. In the terminal device 9, a specific communication device 92 is provided as a replacement of the wireless communication unit 42 in the terminal device 4 described above. The communication system 101 illustrated in FIG. 14 may include a plurality (for example, two) of the terminal devices 9 (for example, terminal devices 9a and 9b). The specific communication device 92 in the terminal device 9a may perform communication using the first frequency band, and the specific communication device 92 in the terminal device 9b may perform communication using the second frequency band.

The management device 2 may be configured to acquire the battery information by wireless communication at the battery management cycle described above. Then, when the reception intensity represented by reception state information transmitted from the terminal device 9a becomes less than a predetermined threshold value, the management device 2 may be configured to thereafter use the second frequency band to perform wireless communication with the terminal device 9b for acquiring the battery information.

In such manner, in the communication system 101, when the communication state using the first frequency band, which is a frequency band being used, deteriorates, a good communication state can newly be acquired using the second frequency band. If both of the terminal device 9a and the terminal device 9b have acquired the same battery information, the management device 2 of the communication system 101 can continue acquisition of the battery information, even when the communication state using the first frequency band deteriorates.

Figure 15:
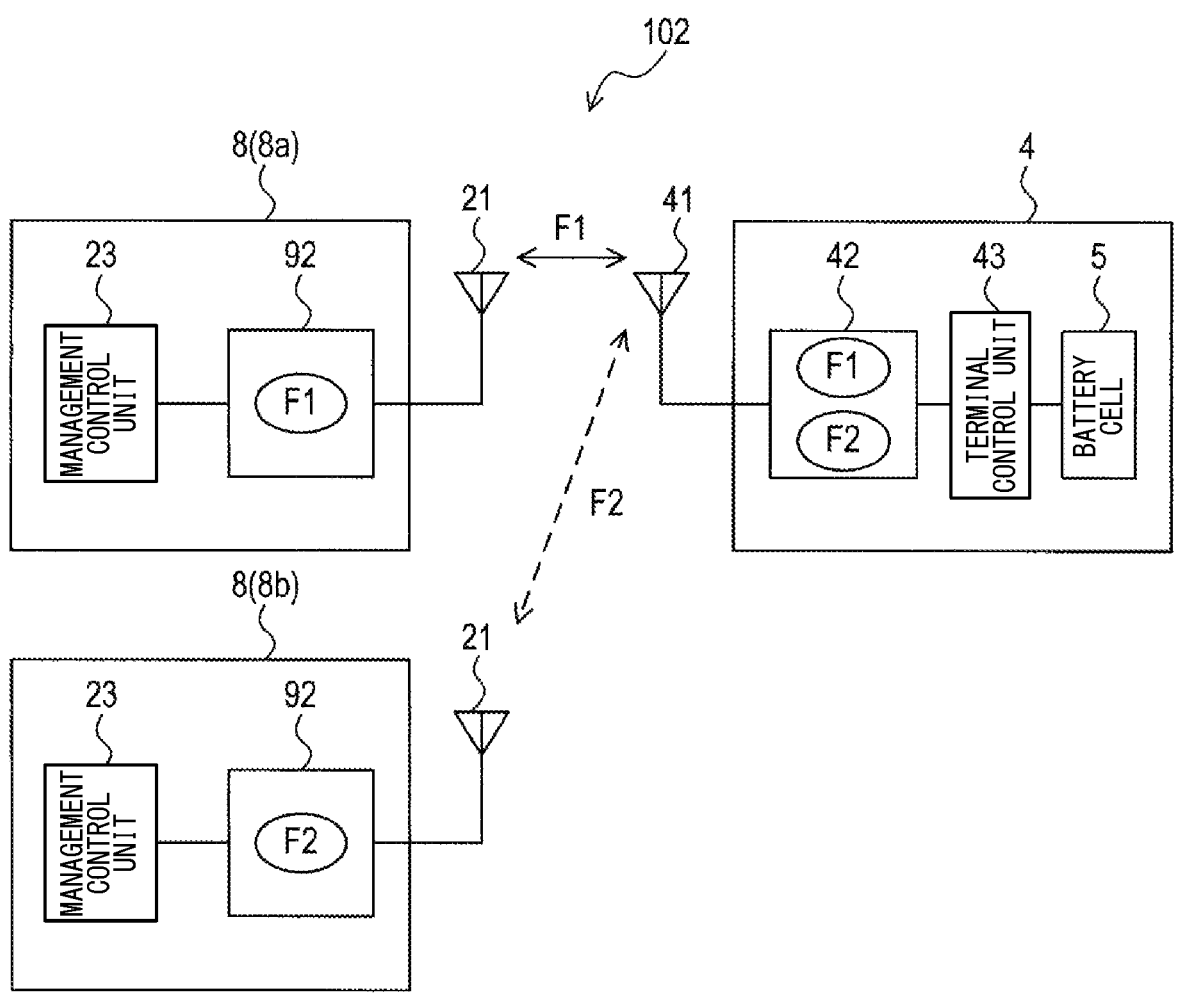
FIG. 15 is a block diagram of a configuration of the communication system according to yet another embodiment 5c.

(5c) For example, a communication system 102 in the present disclosure may include a management device 8 and the terminal device 4 including a multi-band communication device, as illustrated in FIG. 15. The communication system 102 illustrated in FIG. 15 may include a plurality (for example, two) of the management devices 8 (for example, management devices 8a and 8b). In the management device 8, the specific communication device 92 is provided as a replacement of the wireless communication unit 22 in the management device 2 described above. The specific communication device 92 included in the management device 8a may perform communication using the first frequency band. The specific communication device 92 included in the management device 8b may perform communication using the second frequency band.

The terminal device 4 may be configured to wirelessly communicate the battery information using the first frequency band with the management device 8a in accordance with a transmission instruction signal. Then, if the transmission instruction signal is not transmitted from the management device 8a for a predetermined period of time, the terminal device 4 may be configured to thereafter transmit the battery information by wireless communication with the management device 8b using the second frequency band.

In such manner, in the communication system 102, when the communication state using the first frequency band, which is a frequency band being used, deteriorates, a good communication state can newly be acquired using the second frequency band. At least one of the management device 8a and the management device 8b of the communication system 102 can continue acquisition of the battery information even when the communication state using the first frequency band deteriorates.

(5d) In S140, the management control unit 23 (that is, the update unit 62) described above has acquired the terminal side intensity information as the reception state information. However, the present disclosure is not limited to the above-described process. In S140, the management control unit 23 may acquire the management side intensity information for each of the plural terminal devices 4. Then, in S150, the management control unit 23 may be configured to update the used frequency band to the frequency band in which the highest reception intensity is acquired among the plural frequency bands, based on the management side intensity information.

(5e) In the above embodiment, the communication system 1 was mounted on the vehicle V1, but the present disclosure is not limited to such a configuration. For example, the communication system 1 may be mounted in various devices other than the vehicle V1, or may be used by being connected to various devices.

(5f) The management control unit 23, the terminal control unit 43, and the method thereof according to the present disclosure may be realized by a dedicated computer provided by configuring a processor and a memory programmed to execute one or plural functions embodied by a computer program. Alternatively, the management control unit 23, the terminal control unit 43, and the method thereof described in the present disclosure may be realized by a dedicated computer provided by configuring a processor with one or more dedicated hardware logic circuits. Alternatively, the management control unit 23, the terminal control unit 43, and the method thereof described in the present disclosure may be realized by one or more dedicated computers configured as a combination of (i) a processor and a memory programmed to execute one or more functions, and (ii) a processor configured as one or more hardware logic circuits. Further, the computer program may be stored in a computer-readable, non-transitory, tangible storage medium as instructions to be executed by a computer. The method for realizing the functions of the respective units included in the management control unit 23 and the terminal control unit 43 does not necessarily include software, and all the functions may be realized by using one or more devices.

(5g) The multiple functions of one component in the above embodiment may be realized by multiple components, or a function of one component may be realized by the multiple components. In addition, multiple functions of multiple components may be realized by one component, or a single function realized by multiple components may be realized by one component. In addition, a part of the configuration of the above embodiment may be omissible. At least a part of the configuration of the above embodiment may be added to or substituted for the configuration of the embodiments other than the above embodiment.

(5h) In addition to the above-described management control unit 23, the terminal control unit 43, the CPU 26, the CPU 46, the management device 2, the terminal device 4, the battery module 3, and the communication system 1, the present disclosure may also be realized in various forms such as (i) a program for the functional operation of the management control unit 23 and the terminal control unit 43, (ii) a non-transitory, substantial storage medium such as a semiconductor memory recording such a program, a communication method thereof or the like.

In the above embodiment, the battery cell 5 corresponds to a "battery," the wireless communication unit 22 and the wireless communication unit 42 correspond to a "multi-band communication device," the memory 27 corresponds to a "management storage device," and the memory 47 corresponds to a "terminal storage device." The wireless communication unit 22 and the wireless communication unit 42 as the multi-band communication device may also correspond to the specific communication device.

The management control unit 23 (that is, the update unit 62) corresponds to an "intensity acquisition unit," an "update execution unit," and a "timing determination unit." S140 corresponds to the process as the intensity acquisition unit, S150 corresponds to the process as the update execution unit, and S110 corresponds to the process as the timing determination unit. Further, the battery information corresponds to information about the battery, and the plural, different frequency bands correspond to plural frequency bands used in the communication system 1.

What is claimed is:

1. A communication system comprising:
   at least one terminal device for acquiring at least information about a battery; and
   at least one management device,
   wherein
   the management device communicates with the terminal device,
   one of the management device and the terminal device includes a multi-band communication device configured to perform communication using plural, different frequency bands,
   other of the management device and the terminal device includes a specific communication device configured to perform communication using at least one frequency band among the plural, different frequency bands,
   each of the plural terminal devices includes a terminal storage device that stores at least one frequency band of the plural, different frequency bands as a used frequency band for communication between the terminal device and the management device, and
   the management apparatus includes (i) a management storage device for storing the used frequency band for each of the plural terminal devices and (ii) an update unit configured to update the used frequency band for each of the plural terminal devices.

2. The communication system according to claim 1, wherein
   the management device includes the multi-band communication device, and
   the terminal device includes the specific communication device.

3. The communication system according to claim 1, wherein
   the update unit includes:
      an intensity acquisition unit configured to acquire, as reception state information, at least one of (i) management side intensity information representing a reception intensity of a wireless communication signal of each of the plural, different frequency bands used by the communication system, which is a wireless communication signal transmitted from each of the plural terminal devices to the management device and (ii) terminal side intensity information representing a reception intensity of the wireless communication signal of each of the plural, different frequency bands; and
      an update execution unit configured to update the used frequency band to a frequency band in which a high reception intensity is acquired among the plural, different frequency bands based on the reception state information.

4. A communication system comprising:
   at least one terminal device for acquiring at least information about a battery; and
   at least one management device,
   wherein
   the management device communicates with the terminal device,
   one of the management device and the terminal device includes a multi-band communication device configured to perform communication using plural, different frequency bands,
   other of the management device and the terminal device includes a specific communication device configured to perform communication using at least one frequency band among the plural, different frequency bands,
   each of the plural terminal devices includes a terminal storage device that stores at least one frequency band of the plural, different frequency bands as a used frequency band for communication between the terminal device and the management device,
   the management apparatus includes (i) a management storage device for storing the used frequency band for each of the plural terminal devices and (ii) an update unit configured to update the used frequency band for each of the plural terminal devices,
   the management device includes a timing determination unit that determines that an update timing is reached when a predetermined update condition is satisfied, and
   the update unit is configured to update the used frequency band for each of the plural terminal devices when it is determined that the update timing is reached.

5. The communication system according to claim 4, wherein
   the communication system is mounted on the vehicle, and
   the timing determination unit determines that the update timing is reached when the vehicle stops, considering a stop of the vehicle as a satisfaction of the update condition.

6. The communication system according to claim 1, wherein
   at least the management device includes plural antennas.

7. A communication system comprising:
   a management device including:
      (i) a management antenna,
      (ii) a management wireless communicator, and
      (iii) a management controller including: a management processor and a management memory, wherein the management memory is a management non-transitory computer-readable storage medium;

a first terminal device including:
(i) a first antenna,
(ii) a first terminal wireless communicator, and
(iii) a first terminal controller including: a first terminal processor and a first terminal memory; and a second terminal device including:
(i) a second antenna,
(ii) a second terminal wireless communicator, and
(iii) a second terminal controller including: a second terminal processor and a second terminal memory, wherein the management device is configured to receive vehicle information, wherein the first terminal device is configured to receive first battery information from a first battery, and wherein the second terminal device is configured to receive second battery information from a second battery.

8. The communication system of claim 7, wherein the management wireless communicator includes:
a first management filter configured to pass a first frequency band;
a second management filter configured to pass a second frequency band that is higher than the first frequency band;
a first transceiver;
a second transceiver; and
a management main switch connected to the management antenna, wherein the management main switch is configured to operate in at least three management states:
(i) a first management state connecting the management antenna to the first management filter,
(ii) a second management state connecting the management antenna to the second management filter, and
(iii) a third management state isolating the management antenna from both of the management filters.

9. The communication system of claim 8, wherein the first transceiver includes:
a first transmitter,
a first transmission frequency switch associated with the first transmitter,
a first power amplifier associated with the first transmitter,
a first receiver,
a first reception frequency switch associated with the first receiver,
a first low noise amplifier associated with the first receiver, and
a first transceiver switch in communication with the first management filter, and configured to operate in at least three states:
(i) connecting the first management filter to the first power amplifier,
(ii) connecting the first management filter to the first low noise amplifier, and
(iii) isolating the first management filter from both the first power amplifier and the first low noise amplifier.

10. The communication system of claim 9, wherein the second transceiver includes:
a second transmitter,
a second transmission frequency switch associated with the second transmitter,
a second power amplifier associated with the second transmitter,
a second receiver,
a second reception frequency switch associated with the second receiver,
a second low noise amplifier) associated with the second receiver, and
a second transceiver switch in communication with the second management filter, and configured to operate in at least three states:
(i) connecting the second management filter to the second power amplifier,
(ii) connecting the second management filter to the second low noise amplifier, and
(iii) isolating the second management filter from both the second power amplifier and the second low noise amplifier.

11. The communication system of claim 10, wherein wireless management communicator is configured to operate in at least four communication states, based upon switching signals received by the management main switch, the first transceiver switch, and the second transceiver switch,
a first transmission state for transmitting in the first frequency band from the first transmitter,
a first receiving state for receiving in the first frequency band by the first receiver,
a second transmission state for transmitting in the second frequency band from the second transmitter, and
a second receiving state for receiving in the second frequency band by the second receiver.

12. The communication system of claim 8, wherein the management memory stores instructions that perform a battery management cycle upon execution, the battery management cycle includes:
acquire vehicle information;
determine that an updating condition is met;
select the first terminal device, and transmit a start updating signal to the first terminal device using a stored used frequency band associated with the first terminal device, wherein the stored used frequency band is the first frequency band or the second frequency band;
set the management wireless communicator for transmitting in the stored used frequency band;
transmit an initial test signal to the first terminal device using the stored used frequency band;
determine that an initial reply signal in the stored used frequency band from the first terminal device is received,
store initial terminal reception state information associated with a quality of the initial reply signal;
determine that one of the first frequency band or the second frequency band has not been processed;
set the management wireless communicator for transmitting in an subsequent frequency band, wherein the subsequent frequency band is different from the stored used frequency band;
transmit a subsequent test signal to the first terminal device using the subsequent frequency band;
determine that a subsequent reply signal in the subsequent frequency band from the first terminal device is received;
store subsequent terminal reception state information associated with a quality of the subsequent reply signal;
determine that the first frequency band and the second frequency band have both been processed;
determine a highest quality reply signal, and store a frequency band associated with the highest quality reply signal as an updated used frequency band associated with the first terminal device; and
transmit a first update signal to the first terminal device, such that the first terminal device stores the updated used frequency band.

13. The communication system of claim 12, wherein instructions for the battery management cycle further comprise:
- determine that not all terminal devices have been processed regarding determining the respective highest quality reply signal;
- continue processing all remaining terminal devices until a respective highest quality reply signal has been determined for all terminal devices;
- select the updated used frequency associated with the first terminal device;
- transmit a transmission instruction signal to the first terminal device using the updated used frequency;
- receive a battery information signal from the first terminal device, wherein the battery information signal contains recent battery information associated with the first battery.

14. The communication system of claim 7,
wherein the first terminal memory is a terminal non-transitory computer-readable storage medium storing instructions for performing a terminal management cycle when executed,
wherein the terminal management cycle includes:
set the terminal wireless communicator to receive in a used frequency band;
determine that a start signal is received;
select a selected frequency band from the first frequency band and the second frequency band;
set the first terminal wireless communicator to receive in the selected frequency band;
determine that a test signal is received in the selected frequency band;
acquire and store reception state information associated with a terminal side quality of the received test signal; and
set the first terminal wireless communicator to transmit, and transmit a wireless communication signal including the reception state information.

15. The communication system of claim 14, wherein the terminal management cycle further includes:
- continue processing until reception state information has been transmitted for the first frequency band and for the second frequency band;
- determine that an update signal has been received;
- identify an updated frequency band;
- store the updated frequency band as a used frequency band;
- set the terminal wireless communicator to receive in the used frequency band;
- determine that an instruction signal is received;
- acquire battery information; and
- transmit a response including the battery information.

16. The communication system according to claim 1, wherein
the update unit updates the use frequency band for each of the terminal device based on the reception intensity of the wireless communication signal of each of the plural, different and predetermined frequency bands.

17. The communication system according to claim 4, wherein
the update unit updates the use frequency band for each of the terminal device based on the reception intensity of the wireless communication signal of each of the plural, different and predetermined frequency bands.

18. The communication system according to claim 4, wherein
the update unit includes:
an intensity acquisition unit configured to acquire, as reception state information, at least one of (i) management side intensity information representing a reception intensity of a wireless communication signal of each of the plural, different frequency bands used by the communication system, which is a wireless communication signal transmitted from each of the plural terminal devices to the management device and (ii) terminal side intensity information representing a reception intensity of the wireless communication signal of each of the plural, different frequency bands; and
an update execution unit configured to update the used frequency band to a frequency band in which a high reception intensity is acquired among the plural, different frequency bands based on the reception state information.

19. The communication system according to claim 1, wherein
the update unit updates the use frequency band to a frequency band in which a highest reception intensity is acquired among the plural, different frequency bands based on the reception state information.

20. The communication system according to claim 4, wherein
the update unit updates the use frequency band to a frequency band in which a highest reception intensity is acquired among the plural, different frequency bands based on the reception state information.

* * * * *